(12) United States Patent
Ogawa

(10) Patent No.: US 10,839,552 B2
(45) Date of Patent: Nov. 17, 2020

(54) IMAGE PROCESSING APPARATUS, TRACKING METHOD, AND PROGRAM

(71) Applicant: NEC CORPORATION, Tokyo (JP)

(72) Inventor: Takuya Ogawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 261 days.

(21) Appl. No.: 15/984,653

(22) Filed: May 21, 2018

(65) Prior Publication Data
US 2018/0350102 A1    Dec. 6, 2018

(30) Foreign Application Priority Data

Jun. 1, 2017    (JP) .................... 2017-109056

(51) Int. Cl.
*G06T 7/73*    (2017.01)
*G06T 7/246*    (2017.01)

(52) U.S. Cl.
CPC .............. *G06T 7/74* (2017.01); *G06T 7/246* (2017.01); *G06T 2207/30196* (2013.01); *G06T 2207/30242* (2013.01)

(58) Field of Classification Search
CPC ... G06T 7/11; G06T 7/20; G06T 7/246; G06T 2207/30196; G06T 2207/20232; G06T 2207/20242; G06K 9/00335; G06K 9/00362; G06K 9/00624; G06K 9/00711; G06K 2009/00738; G06K 9/00771; G06K 9/00778
See application file for complete search history.

(56) References Cited

U.S. PATENT DOCUMENTS

| | | | |
|---|---|---|---|
| 2012/0128212 A1* | 5/2012 | Almbladh | G06T 7/20 382/107 |
| 2013/0307974 A1 | 11/2013 | Kawano | G06K 9/00771 |
| 2014/0355829 A1* | 12/2014 | Heu et al. | G06T 7/20 382/103 |
| 2016/0260226 A1* | 9/2016 | Yano et al. | G06T 7/277 |
| 2017/0213090 A1* | 7/2017 | Oami et al. | G06F 3/0416 |
| 2018/0005046 A1* | 1/2018 | Miyano | G06T 7/248 |

FOREIGN PATENT DOCUMENTS

| | | | |
|---|---|---|---|
| JP | 08-153187 A | 6/1996 | ............ G06T 1/00 |
| JP | 2003-44859 A | 2/2003 | ............ G06T 7/20 |
| JP | 2008-288684 A | 11/2008 | ............ H04N 7/18 |
| JP | 2013-240013 A | 11/2013 | ............ H04N 5/232 |

OTHER PUBLICATIONS

International Search Report and Written Opinion dated Aug. 21, 2018 issued by the International Searching Authority in No. PCT/JP2018/020873.

* cited by examiner

*Primary Examiner* — Andrew W Johns
(74) *Attorney, Agent, or Firm* — Sughrue Mion, PLLC

(57) ABSTRACT

A technique of tracking objects with high accuracy even in an environment where the objects largely overlap with each other is provided. An image processing apparatus includes a detecting unit configured to detect an object region from an input image, an estimating unit configured to estimate a number of objects included in the detected object region, and a tracking unit configured to track objects included in the object region using the estimated number of objects.

11 Claims, 29 Drawing Sheets

FIG. 3
| THE NUMBER OF PERSONS | IMAGE |
|---|---|
| 0 | 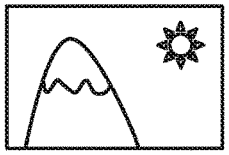 |
| 1 | 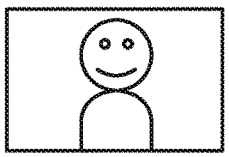 |
| 1 | 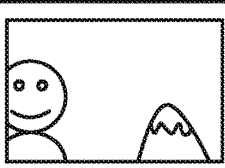 |
| 2 | 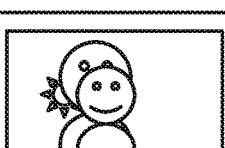 |
| 2 |  |
| 2 | 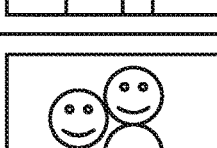 |
| 3 | 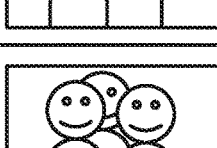 |
| 3 | 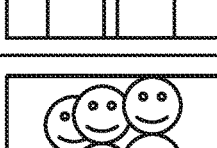 |
| 3 | 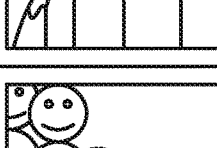 |
152

FIG. 5

151 TRACKING INFORMATION

| TRACKING ID (51) | TIME (52) | OBJECT REGION | | THE NUMBER OF PERSONS (57) | IMAGE ID (58) | FEATURE AMOUNT (59) |
| --- | --- | --- | --- | --- | --- | --- |
| | | LOCATION (54) | WIDTH (53) / HEIGHT (55,56) | | | |
| a1 | t1 | (x1,y1) | ww1 / hh1 | 1 | IM02 | F1 |
| a1 | t2 | (x2,y2) | ww2 / hh2 | 1 | IM03 | F2 |
| a1 | t3 | (x3,y3) | ww3 / hh3 | 1 | IM04 | F3 |

FIG. 9

151A TRACKING INFORMATION

| TRACKING ID | TIME | OBJECT REGION | | | THE NUMBER OF PERSONS | IMAGE ID | FEATURE AMOUNT |
|---|---|---|---|---|---|---|---|
| | | LOCATION | WIDTH | HEIGHT | | | |
| a1 | t1 | (x1,y1) | ww1 | hh1 | 1 | IM02 | F1 |
| a1 | t2 | (x2,y2) | ww2 | hh2 | 1 | IM03 | F2 |
| a1 | t3 | (x3,y3) | ww3 | hh3 | 1 | IM04 | F3 |
| a1 | t4 | (x4,y4) | ww4 | hh4 | 1 | IM05 | F4 |

FIG. 10

151B TRACKING INFORMATION

| | TRACKING ID (51) | TIME (52) | OBJECT REGION (53) | | | THE NUMBER OF PERSONS (57) | IMAGE ID (58) | FEATURE AMOUNT (59) |
|---|---|---|---|---|---|---|---|---|
| | | | LOCATION (54) | WIDTH (55) | HEIGHT (56) | | | |
| 101A | a2 | t5 | (x5,y1) | ww5 | hh5 | 2 | IM25 | F5 |
| 101B | b2 | t5 | (x5,y1) | ww5 | hh5 | 2 | IM25 | F5 |
| 101C | a2 | t6 | (x6,y2) | ww6 | hh6 | 2 | IM26 | F6 |
| 101D | b2 | t6 | (x6,y2) | ww6 | hh6 | 2 | IM26 | F6 |
| 101E | a2 | t7 | (x7,y3) | ww7 | hh7 | 2 | IM27 | F7 |
| 101F | b2 | t7 | (x7,y3) | ww7 | hh7 | 2 | IM27 | F7 |

FIG. 13

151C TRACKING INFORMATION

| TRACKING ID | TIME | OBJECT REGION | | | THE NUMBER OF PERSONS | IMAGE ID | FEATURE AMOUNT |
|---|---|---|---|---|---|---|---|
| | | LOCATION | WIDTH | HEIGHT | | | |
| a2 | t5 | (x5,y1) | ww5 | hh5 | 2 | IM25 | F5 |
| b2 | t5 | (x5,y1) | ww5 | hh5 | 2 | IM25 | F5 |
| a2 | t6 | (x6,y2) | ww6 | hh6 | 2 | IM26 | F6 |
| b2 | t6 | (x6,y2) | ww6 | hh6 | 2 | IM26 | F6 |
| a2 | t7 | (x7,y3) | ww7 | hh7 | 2 | IM27 | F7 |
| b2 | t7 | (x7,y3) | ww7 | hh7 | 2 | IM27 | F7 |
| a2 | t8 | (x8A,y8A) | ww8A | hh8A | 1 | IM28 | F8A |
| b2 | t8 | (x8B,y8B) | ww8B | hh8B | 1 | IM28 | F8B |

Column labels: 51, 52, 54, 53, 55, 56, 57, 58, 59

Row labels: 101A, 101B, 101C, 101D, 101E, 101F, 101G, 101H

FIG. 15

151D TRACKING INFORMATION

| TRACKING ID | TIME | OBJECT REGION | | | THE NUMBER OF PERSONS | IMAGE ID | FEATURE AMOUNT |
| --- | --- | --- | --- | --- | --- | --- | --- |
| | | LOCATION | WIDTH | HEIGHT | | | |
| a1 | t1 | (x1,y1) | ww1 | hh1 | 1 | IM02 | F1 |
| a1 | t2 | (x2,y2) | ww2 | hh2 | 1 | IM03 | F2 |
| a1 | t3 | (x3,y3) | ww3 | hh3 | 1 | IM04 | F3 |
| a1 | t3+1 | (x8,y8) | ww8 | hh8 | 1 | IM06 | F8 |
| b1 | t3+1 | (x9,y9) | ww9 | hh9 | 2 | IM06 | F9 |
| c1 | t3+1 | (x9,y9) | ww9 | hh9 | 2 | IM06 | F9 |

FIG. 17

151E TRACKING INFORMATION

| TRACKING ID | TIME | OBJECT REGION | | | THE NUMBER OF PERSONS | IMAGE ID | FEATURE AMOUNT |
|---|---|---|---|---|---|---|---|
| | | LOCATION | WIDTH | HEIGHT | | | |
| a3 | t10 | (x10A,y10A) | w10A | h10A | 1 | IM10 | F10A |
| b3 | t10 | (x10B,y10B) | w10B | h10B | 1 | IM10 | F10B |
| a3 | t11 | (x11A,y11A) | w11A | h11A | 1 | IM11 | F11A |
| b3 | t11 | (x11B,y11B) | w11B | h11B | 1 | IM11 | F11B |

151F TRACKING INFORMATION

| 51 | 52 | 53 | | 55 | 57 | 58 | 59 |
|---|---|---|---|---|---|---|---|
| | | 54 OBJECT REGION | | 56 | | | |
| TRACKING ID | TIME | LOCATION | WIDTH | HEIGHT | THE NUMBER OF PERSONS | IMAGE ID | FEATURE AMOUNT |
| a3 | t10 | (x10A,y10A) | w10A | h10A | 1 | IM10 | F10A |
| b3 | t10 | (x10B,y10B) | w10B | h10B | 1 | IM10 | F10B |
| a3 | t11 | (x11A,y11A) | w11A | h11A | 1 | IM11 | F11A |
| b3 | t11 | (x11B,y11B) | w11B | h11B | 1 | IM11 | F11B |
| a3 | t12 | (x12,y12) | w12 | h12 | 2 | IM12 | F11A |
| b3 | t12 | (x12,y12) | w12 | h12 | 2 | IM12 | F11B |

| TRACKING ID | TIME | OBJECT REGION | | | THE NUMBER OF PERSONS | IMAGE ID | FEATURE AMOUNT |
|---|---|---|---|---|---|---|---|
| | | LOCATION | WIDTH | HEIGHT | | | |
| a3 | t10 | (x10A,y10A) | w10A | h10A | 1 | IM10 | F10A |
| b3 | t10 | (x10B,y10B) | w10B | h10B | 1 | IM10 | F10B |
| a3 | t11 | (x11A,y11A) | w11A | h11A | 1 | IM11 | F11A |
| b3 | t11 | (x11B,y11B) | w11B | h11B | 1 | IM11 | F11B |
| a3 | t12 | (x12,y12) | w12 | h12 | 2 | IM12 | F11A |
| c3 | t12 | (x12,y12) | w12 | h12 | 2 | IM12 | F12 |

151G TRACKING INFORMATION

FIG. 21

151H TRACKING INFORMATION

| TRACKING ID | TIME | OBJECT REGION | | | THE NUMBER OF PERSONS | IMAGE ID | FEATURE AMOUNT |
|---|---|---|---|---|---|---|---|
| 51 | 52 | LOCATION 54 | WIDTH 53 | HEIGHT 56 | 57 | 58 | 59 |
| a5 | t16 | (x16,y16) | w16 | h16 | 3 | IM16 | F16 |
| b5 | t16 | (x16,y16) | w16 | h16 | 3 | IM16 | F16 |
| c5 | t16 | (x16,y16) | w16 | h16 | 3 | IM16 | F16 |
| a5 | t17 | (x17,y17) | w17 | h17 | 3 | IM17 | F17 |
| b5 | t17 | (x17,y17) | w17 | h17 | 3 | IM17 | F17 |
| c5 | t17 | (x17,y17) | w17 | h17 | 3 | IM17 | F17 |

FIG. 23

151J TRACKING INFORMATION

| TRACKING ID | TIME | OBJECT REGION | | | THE NUMBER OF PERSONS | IMAGE ID | FEATURE AMOUNT |
|---|---|---|---|---|---|---|---|
| | | LOCATION | WIDTH | HEIGHT | | | |
| a5 | t16 | (x16,y16) | w16 | h16 | 3 | IM16 | F16 |
| b5 | t16 | (x16,y16) | w16 | h16 | 3 | IM16 | F16 |
| c5 | t16 | (x16,y16) | w16 | h16 | 3 | IM16 | F16 |
| a5 | t17 | (x17,y17) | w17 | h17 | 3 | IM17 | F17 |
| b5 | t17 | (x17,y17) | w17 | h17 | 3 | IM17 | F17 |
| c5 | t17 | (x17,y17) | w17 | h17 | 3 | IM17 | F17 |
| a5 | t18 | (x18,y18) | w18 | h18 | 2 | IM18 | F18 |
| b5 | t18 | (x18,y18) | w18 | h18 | 2 | IM18 | F18 |
| c5 | t18 | (x18C,y18C) | w18C | h18C | | IM18 | |

151K TRACKING INFORMATION

| TRACKING ID | TIME | OBJECT REGION | | | THE NUMBER OF PERSONS | IMAGE ID | FEATURE AMOUNT |
|---|---|---|---|---|---|---|---|
| 51 | 52 | LOCATION (54) | WIDTH (53) | HEIGHT (56) | 57 | 58 | 59 |
| a6 | t19 | (x19,y19) | w19 | h19 | 1 | IM19 | F19 |
| a6 | t20 | (x20,y20) | w20 | h20 | 1 | IM20 | F20 |

FIG. 26

151L TRACKING INFORMATION

| TRACKING ID | TIME | OBJECT REGION | | | THE NUMBER OF PERSONS | IMAGE ID | FEATURE AMOUNT |
|---|---|---|---|---|---|---|---|
| 51 | 52 | 54 LOCATION | 53 WIDTH | 55/56 HEIGHT | 57 | 58 | 59 |
| a6 | t19 | (x19,y19) | w19 | h19 | 1 | IM19 | F19 |
| a6 | t20 | (x20,y20) | w20 | h20 | 1 | IM20 | F20 |
| a6 | t21 | (x21A,y21A) | w21A | h21A |  | IM21 |  |

| | | OBJECT REGION | | | | | |
|---|---|---|---|---|---|---|---|
| TRACKING ID | TIME | LOCATION | WIDTH | HEIGHT | THE NUMBER OF PERSONS | IMAGE ID | FEATURE AMOUNT |
| a6 | t19 | (x19,y19) | w19 | h19 | 1 | IM19 | F19 |
| a6 | t20 | (x20,y20) | w20 | h20 | 1 | IM20 | F20 |
| a6 | t21 | (x21B,y21B) | w21B | h21B | 1 | IM21 | F20 |

151M TRACKING INFORMATION

IMAGE PROCESSING APPARATUS, TRACKING METHOD, AND PROGRAM

BACKGROUND OF THE DISCLOSURE

Technical Field

The present disclosure relates to an image processing apparatus, a tracking method, and a program.

Background

A method for detecting a person from an image has been proposed. For example, Japanese Patent Laid-Open No. 2008-288684 discloses an apparatus which detects a person. Japanese Patent Laid-Open No. 2008-288684 discloses detecting a person by specifying a region indicating an entire body including both legs by detecting the both legs in an open state which appears when the person is walking.

Further, Japanese Patent Laid-Open No. 8-153187 discloses a method for extracting person regions respectively including one person by separating a plurality of objects in an input image. Japanese Patent Laid-Open No. 8-153187 discloses obtaining a difference image between the input image and a background image, creating a silhouette function using the difference image and extracting person regions respectively including one person by separating a plurality of objects in the input image using a threshold for a shoulder width of a person and a threshold for a difference between a height of the head and a height of the shoulders obtained in advance.

In the case where a plurality of persons are included in an image in an overlapped manner, with the technique disclosed in Japanese Patent Laid-Open No. 2008-288684, there is a possibility that both legs in an open state cannot be detected or only one leg is detected. Therefore, with the technique disclosed in Japanese Patent Laid-Open No. 2008-288684, there is a possibility that a plurality of persons are not detected as persons or a plurality of persons are collectively detected as one person.

Further, with the technique disclosed in Japanese Patent Laid-Open No. 8-153187, a person is detected using silhouettes of the head and the shoulders of the person. However, there is a possibility that the shoulders of each of a plurality of persons do not appear as silhouettes because overlapped portions are large, or in a scene where the heads are included in an image in an overlapped manner, each of the plurality of persons cannot be detected.

Therefore, with the above-described techniques of Japanese Patent Laid-Open No. 2008-288684 and Japanese Patent Laid-Open No. 8-153187, in a crowded scene where persons largely overlap with each other or in a scene including a number of persons passing each other, because there is a high possibility that a person cannot be detected, it is difficult to track a person in the above-described scenes.

The present disclosure has been made in view of the above-described problems, and is directed to providing a technique of tracking objects with high accuracy even in an environment where the objects largely overlap with each other.

SUMMARY OF THE DISCLOSURE

An image processing apparatus according to one aspect of the present disclosure includes a processor configured to execute a detecting unit configured to detect an object region from an input image, an estimating unit configured to estimate a number of objects included in the detected object region, and a tracking unit configured to track objects included in the object region using the estimated number of objects.

Further, a tracking method according to one aspect of the present disclosure includes detecting an object region from an input image, estimating a number of objects included in the detected object region and tracking objects included in the object region using the estimated number of objects.

A computer program implementing the above-described each apparatus or method by a computer, and a computer readable non-transitory recording medium in which the computer program is stored are also incorporated into the scope of the present disclosure.

According to the present disclosure, it is possible to track objects with high accuracy even in an environment where the objects largely overlap with each other.

BRIEF DESCRIPTION OF THE DRAWINGS

FIG. 3 is a diagram illustrating an example of an image database stored in a storage unit in the first exemplary embodiment;

FIG. 5 is a diagram illustrating an example of tracking information stored in the storage unit in the first exemplary embodiment;

FIG. 9 is a diagram illustrating an example of updated tracking information;

FIG. 10 is a diagram illustrating an example of tracking information in the case where the estimated number of persons included in an object region is two;

FIG. 13 is a diagram illustrating an example of updated tracking information;

FIG. 15 is a diagram illustrating an example of updated tracking information;

FIG. 17 is a diagram illustrating another example of the tracking information;

FIG. 19 is a diagram illustrating an example of tracking information obtained by updating the tracking information in FIG. 17;

FIG. 20 is a diagram illustrating another example of the tracking information obtained by updating the tracking information in FIG. 17;

FIG. 21 is a diagram illustrating another example of the tracking information;

FIG. 23 is a diagram illustrating an example of tracking information obtained by updating the tracking information in FIG. 21;

FIG. 24 is a diagram illustrating another example of the tracking information;

FIG. 26 is a diagram illustrating an example of tracking information obtained by updating the tracking information in FIG. 24;

FIG. 27 is a diagram illustrating another example of the tracking information obtained by updating the tracking information in FIG. 24;

DETAILED DESCRIPTION

First Exemplary Embodiment

Figure 1:
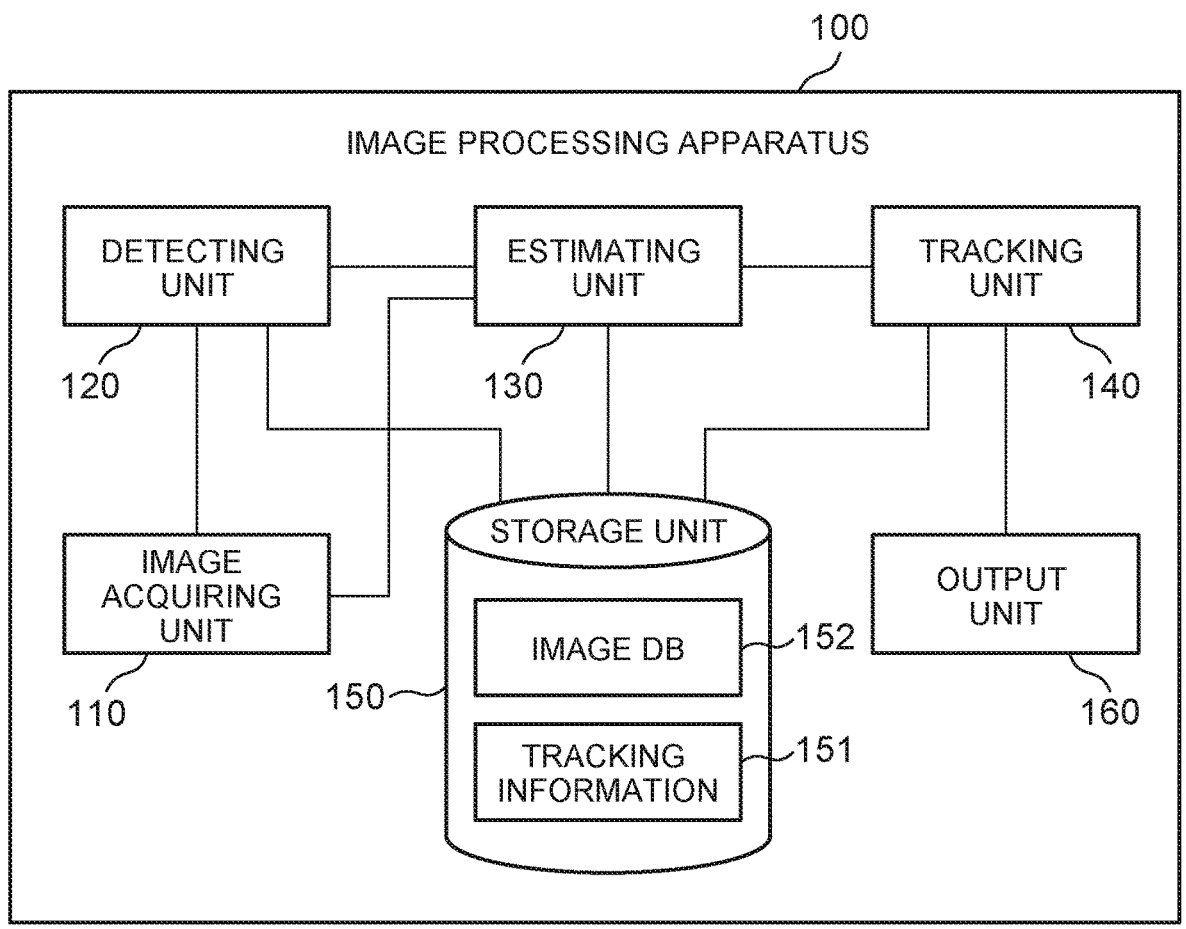
FIG. 1 is a functional block diagram illustrating an example of a functional configuration of an image processing apparatus according to a first exemplary embodiment.

A first exemplary embodiment of the present disclosure will be described with reference to the drawings. FIG. 1 is a functional block diagram illustrating an example of a functional configuration of an image processing apparatus 100 according to the present exemplary embodiment. As illustrated in FIG. 1, the image processing apparatus 100 according to the present exemplary embodiment includes an image acquiring unit 110, a detecting unit 120, an estimating unit 130, a tracking unit 140, a storage unit 150 and an output unit 160.

The image processing apparatus 100 according to the present exemplary embodiment tracks an object included in an input image. In the present exemplary embodiment, description will be provided assuming that the image processing apparatus 100 tracks a person. An object to be tracked by the image processing apparatus 100 is not limited to a person, and, for example, may be an object such as a car or other objects.

The image acquiring unit 110 acquires a picked up image. The image acquiring unit 110, for example, acquires an image picked up by a camera including a lens and an image pickup device. The image acquiring unit 110 may be a camera itself or may acquire an image picked up by a camera from the camera. The image acquiring unit 110 may acquire the picked up image from a recording unit in which the image is recorded. The picked up image may be a moving image or a still image. That is, the image may be each of a plurality of frames constituting a moving image or a still image. In the case where the image acquiring unit 110 is a camera, the image acquiring unit 110 may be implemented with an image pickup apparatus different from the image processing apparatus 100.

Hereinafter, the image acquired by the image acquiring unit 110 will be also referred to as an input image. The image acquiring unit 110 supplies the acquired input image to the detecting unit 120 and the estimating unit 130.

The detecting unit 120 detects an object region indicating a region of a person from the input image. The detecting unit 120 receives the input image from the image acquiring unit 110. The detecting unit 120 detects the object region by detecting a person from the received input image. A method for detecting a person by the detecting unit 120 is not particularly limited, and may be a well-known technique such as a method in which a difference with a background image is obtained, a method in which a shape of a person is detected, and a method in which features of a person learned in advance are used. A background image, information indicating a shape of a person, or the like, to be used by the detecting unit 120 for detecting a person may be stored in the storage unit 150 or may be stored in other storage units.

Figure 2:
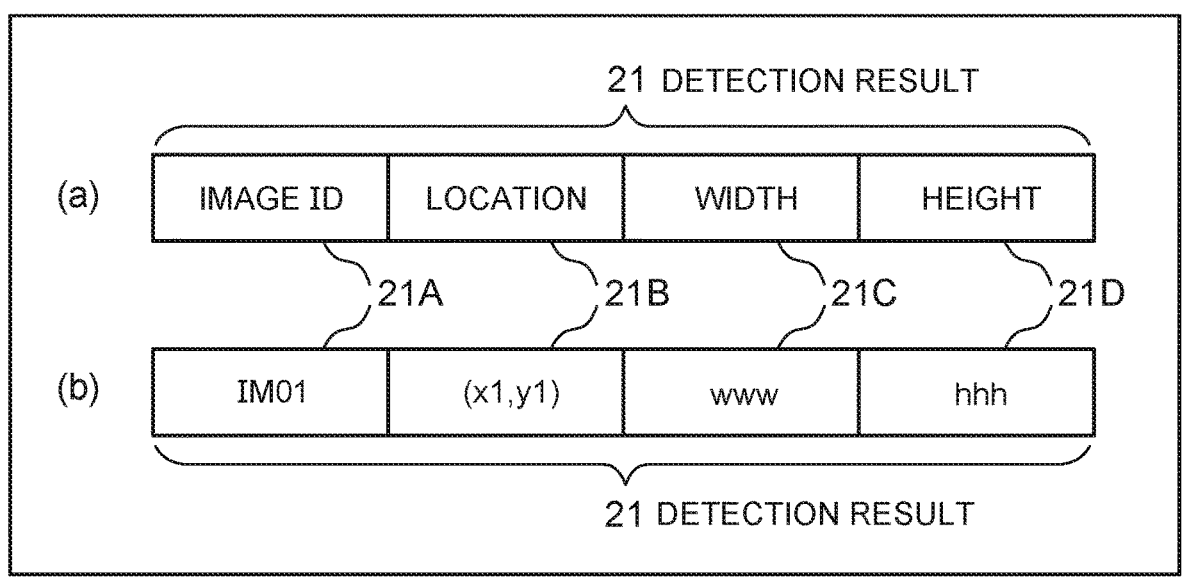
FIG. 2 is a diagram illustrating a data structure of a detection result and an example of the detection result output by a detecting unit in the first exemplary embodiment.

The detecting unit 120 outputs object region information indicating the detected object region and input image information indicating the input image used for detection as a detection result. The detection result output by the detecting unit 120 will be described with reference to FIG. 2. FIG. 2 is a diagram illustrating a data structure of the detection result 21 and an example of the detection result output by the detecting unit 120 in the present exemplary embodiment. (a) in FIG. 2 indicates an example of the data structure of the detection result 21, and (b) in FIG. 2 indicates a specific example of the detection result.

As illustrated in FIG. 2, the detection result 21 includes an image ID (IDentifier) 21A, a location 21B, a width 21C and a height 21D. The image ID 21A is input image information indicating the input image used for detection. In FIG. 2, the image ID 21A is an identifier for identifying the input image. The input image information is not limited to the image ID 21A and may be information which enables identification of the input image.

The location 21B indicates a location of the object region detected by the detecting unit 120 on the input image. In the case where the shape of the object region is, for example, a rectangle, the location 21B may be any coordinate at four corners. While, in the present exemplary embodiment, description will be provided assuming that the shape of the object region is a rectangle, the shape of the object region is not limited to this, and, for example, may be a round or other shapes. In the present exemplary embodiment, description will be provided assuming that the location 21B is a coordinate at an upper left corner of the rectangular object region.

The width 21C indicates a length in one direction of the object region. Further, the height 21D indicates a length of the other direction orthogonal to the one direction of the object region. As described above, because the shape of the object region is a rectangle, and the location 21B is a coordinate at the upper left corner of the rectangular object region, it is possible to express the object region on the input image with the location 21B, the width 21C and the height 21D. That is, in FIG. 2, the object region information includes the location 21B, the width 21C and the height 21D. The object region may be expressed with other information. For example, in the case where the object region is a region expressed with a frame along outline of a person, the object region may be expressed with a group of coordinates respectively indicating one pixel. In the present exemplary embodiment, description will be provided assuming that the object region is expressed with the location, the width and the height.

The detecting unit 120 may store the input image received from the image acquiring unit 110 and the detection result 21 in the storage unit 150 which will be described later. At this time, the detecting unit 120 may store the input image and the detection result 21 in the storage unit 150 in association with each other. In this case, the detection result 21 does not have to include the image ID 21A. Further, the detecting unit 120 may output an image of a portion of the object region (referred to as an object region image) detected on the input image as the detection result.

The detecting unit 120 may detect a plurality of object regions from one input image. In this case, the detecting unit 120 may output the detection result 21 for each of the detected object regions or may output object region information indicating each of the plurality of object regions in association with the image ID 21A indicating the input image which is a detection source, as the detection result 21. In the present exemplary embodiment, description will be provided assuming that the detection result 21 is output for each object region.

The storage unit 150 stores tracking information 151 and an image DB (DataBase) 152. The storage unit 150 is, for example, realized with a magnetic disk apparatus, or the like. The storage unit 150 may be incorporated into the image processing apparatus 100 or may be realized with a storage apparatus which is different from the image processing apparatus 100.

The tracking information 151 is a record of tracking of an object (person) to be tracked, from start of tracking until the present time. The tracking information 151 will be described later using other drawings.

The image DB 152 stores data to be used for calculation of a degree of similarity of feature amounts by the estimating unit 130 which will be described later. FIG. 3 illustrates an example of the image database stored in the storage unit. As illustrated in FIG. 3, the image DB 152 stores data in which the image is associated with the number of persons included in the image.

As illustrated in FIG. 3, the image DB 152 includes various patterns of images including an image which does not include a person (in which the number of persons is zero). As illustrated in FIG. 3, the various patterns of images are images with different numbers of persons included in the images and with different ways of overlapping of persons. The number of persons included in an image is associated with the image as a label. Because it is assumed that a person who does not overlap with other persons is correctly detected as one person in the detection result, an image whose label associated with the image included in the image DB 152 is equal to or larger than two includes some overlapping of persons. The image in which persons overlap with each other may be an image actually picked up or may be an image created through composition. Further, only part of the body, such as the upper body, or the entire body of the person may be included in the image DB 152. Further, the image included in the image DB 152 may be a color image, a grayscale image, a silhouette image or combination of these. Still further, the image included in the image DB 152 may include various variations in background as well as a person. By this means, because patterns of feature amounts extracted from the images increase, the estimating unit 130 which will be described later can estimate the number of persons with high accuracy.

In the image DB 152, a feature amount extracted from the image may be stored in place of the image. The feature amount may be any type if the feature amount can be used by the estimating unit 130 for comparison. Further, the image DB 152 may store a plurality of types of feature amounts.

The estimating unit 130 estimates a number of objects included in the detected object region. The estimating unit 130 receives the detection result from the detecting unit 120. Further, the estimating unit 130 receives the input image from the image acquiring unit 110. The estimating unit 130 extracts an object region image from an input image having the same image ID as the image ID 21A included in the detection result received from the detecting unit 120 among the input image received from the image acquiring unit 110. In the case where the input image is stored in the storage unit 150 in association with the detection result 21 by the detecting unit 120, the estimating unit 130 may extract the object region image from the input image using the input image and the detection result 21 stored in the storage unit 150. In the case where the detecting unit 120 outputs an object region image as the detection result, the estimating unit 130 can omit a process of extracting an object region image.

Figure 4:
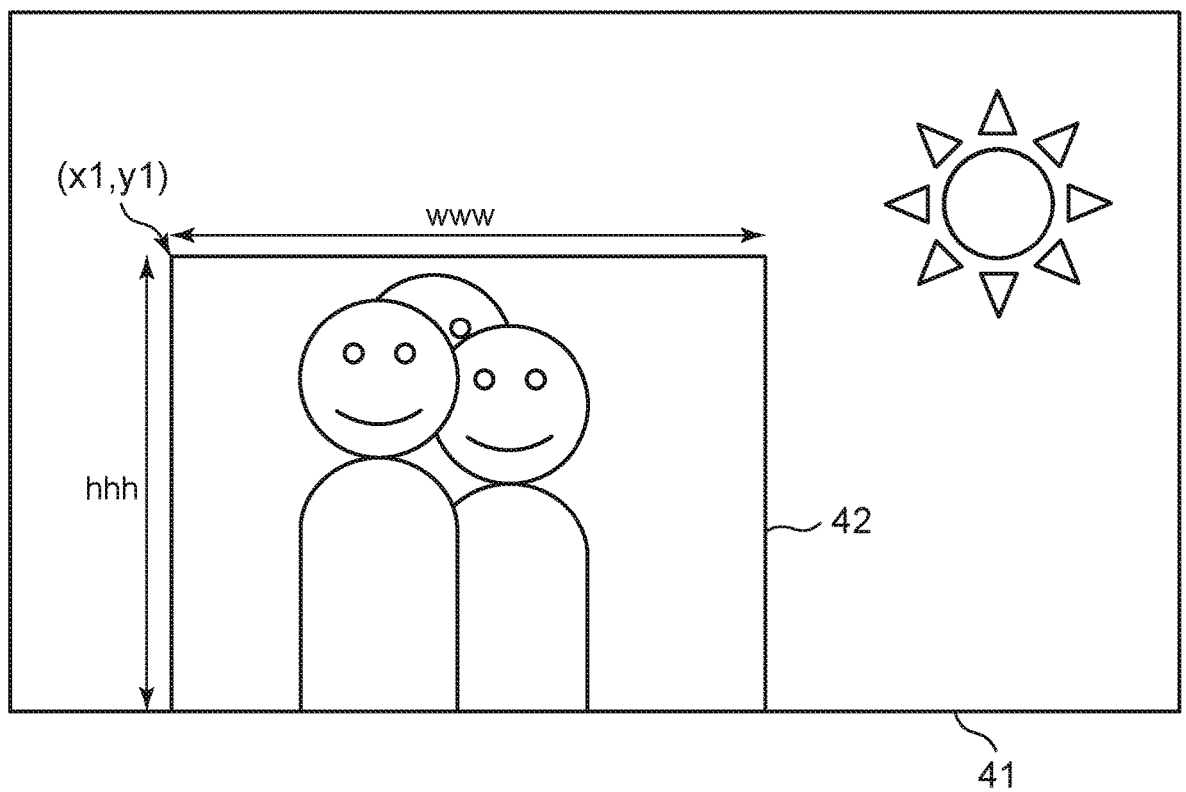
FIG. 4 is a diagram for explaining an example of an object region image extracted by an estimating unit in the first exemplary embodiment.

FIG. 4 is a diagram for explaining an example of the object region image extracted by the estimating unit 130. The input image 41 is an image acquired by the image acquiring unit 110. It is assumed that the image ID of the input image 41 is "IM01". Further, it is assumed that the detection result received at the estimating unit 130 is the detection result 21 illustrated in (b) of FIG. 2.

The estimating unit 130 extracts an object region image, for example, from the input image 41 illustrated in FIG. 4 whose image ID is "IM01" with reference to the detection result 21. The estimating unit 130 extracts an image of a portion of a region (object region) whose width is www and height is hhh from a location indicated with (x1, y1) as the object region image 42 among the input image 41.

The estimating unit 130 extracts a feature amount from the object region image 42. The estimating unit 130 then calculates a degree of similarity between the extracted feature amount and the data stored in the image DB 152 with reference to the image DB 152 stored in the storage unit 150. In the case where the image data is stored in the image DB 152, the estimating unit 130 extracts a feature amount whose type is the same as a type of the feature amount extracted from the object region image 42 (a feature amount which can be compared with the feature amount extracted from the object region image 42) from the image data stored in the image DB 152. The estimating unit 130 then calculates a degree of similarity between the object region image 42 and the image data by comparing the feature amount extracted from the object region image 42 with the feature amount extracted from the image data. The feature amount to be compared by the estimating unit 130 may be, for example, a feature amount extracted from a grayscale image or may be any other feature amount. The feature amount to be compared by the estimating unit 130 may be, for example, a feature amount indicating color, brightness, a pattern, a shape, a size, or the like, of a person.

Further, the estimating unit 130 calculates a likelihood with respect to each number of persons using the calculated degree of similarity. The estimating unit 130 estimates a number of persons with the highest likelihood as the number of persons included in the object region image 42. The estimating unit 130 supplies the estimated number of persons (estimated number of persons) to the tracking unit 140 along with the detection result 21 which is a target of estimation of the number of persons and the feature amount extracted from the object region image 42. The estimating unit 130 may further supply the object region image 42 to the tracking unit 140.

The tracking unit 140 tracks an object included in the object region using the estimated number of persons which is the estimated number of objects. The tracking unit 140 receives the estimated number of persons included in the object region detected by the detecting unit 120 from the estimating unit 130 along with the detection result 21 and the feature amount. The tracking unit 140 tracks a person included in the object region using the estimated number of persons, the detection result 21 and the tracking information 151.

The tracking information 151 is information of tracking with respect to each person included in the input image from start of tracking until when a (past) input image temporally adjacent to the input image which is a target of tracking is picked up. FIG. 5 illustrates an example of the tracking information 151. While, in the present exemplary embodiment, because it is assumed that the input image is sequential frames, description will be provided assuming that the input images are frames which are temporally adjacent to each other, the input image is not limited to this. The input image and the past input image may be a frame extracted from a window with a predetermined width including a plurality of frames and a frame extracted from a window with a predetermined width prior to the window of the predetermined width. That is, the past input image (also referred to as a previous frame) is a frame picked up temporally prior to the input image at the present time (referred to as a current frame), and may be a frame temporally adjacent to (immediately before) the current frame or may be a frame picked up within a predetermined time period from the current frame. In the present exemplary embodiment, it is only necessary that a frame with which the tracking unit 140 can track a person is input as the input image, and all the picked up frames may be input as the input image or part of the picked up frames may be input as the input image in accordance with an image pickup environment, specifications of image pickup equipment, or the like.

As illustrated in FIG. 5, the tracking information 151 includes a tracking ID 51 for specifying a person to be tracked, time 52 indicating time at which an input image including the tracked person is photographed, an object region 53, the number of persons 57, an image ID 58 and a feature amount 59. The information included in the tracking information 151 is an example, and is not limited to those illustrated in FIG. 5.

In FIG. 5, the object region 53 is expressed with a location 54, a width 55 and a height 56. The location 54, the width 55 and the height 56 are respectively the location 21B, the width 21C and the height 21D included in the detection result 21.

The number of persons 57 indicates the number of persons estimated by the estimating unit 130. The image ID 58 indicates the input image including the tracked person, and is the image ID 21A included in the detection result 21. The feature amount 59 is the feature amount extracted from the object region image 42 by the estimating unit 130.

A method for tracking a person by the tracking unit 140 is not particularly limited if processing is performed using sequential frames. The tracking unit 140 may, for example, track a person by employing a tracking scheme using a particle filter or using other methods. The estimating unit 130 provides a tracking ID to a person included in the object region using an estimated location of a person (tracking target) of each tracking ID 51 in a current frame (input image) predicted using the particle filter, and the object region included in the detection result 21 in the current frame, on the basis of the object region 53 associated with the tracking ID 51 indicating the person included in an image (previous frame) immediately before the input image. The estimating unit 130 selects candidates for a person to be associated with the tracking ID using dynamic programming on the basis of closeness of a distance between the estimated location and the detected object region, a moving direction, or the like, and associates the tracking ID with a person for which a degree of similarity of color, a pattern, or the like, between the tracking information 151 until the previous frame and the selected candidates is equal to or higher than a certain level among the candidates.

In FIG. 5, one tracking ID 51 is associated with one object region 53, because the number of persons 57 is "1". In the case where it is estimated by the estimating unit 130 that a plurality of persons are included in the object region 53, a plurality of tracking IDs 51 are associated with the object region 53. Further, a feature amount extracted from the object region 53 is associated with the object region 53. Therefore, the same feature amount 59 is associated with the plurality of tracking IDs 51 associated with the same object region 53. The tracking information 151 in which a plurality of tracking IDs 51 are associated with one object region 53 will be described later using other drawings.

In the case where a plurality tracking IDs 51 are associated with the object region 53 in this manner, because the same feature amount 59 is associated with these plurality of tracking IDs 51, it can be said that tracking of a person performed by the tracking unit 140 is tracking of an object region.

The tracking unit 140 stores the tracking ID, the object region, the estimated number of persons, the extracted feature amount, or the like, in the storage unit 150 as a tracking result. Specifically, the tracking unit 140 sets information of an object region including the person with which the tracking ID is associated (object region information indicating the object region detected by the detecting unit 120) as the object region 53, sets the number of persons estimated by the estimating unit 130 as the number of persons 57 and updates the tracking information 151 by inserting a new record (tracking result) to the tracking information 151 using the extracted feature amount and information relating to the input image to be subjected to tracking processing.

Further, the tracking unit 140 supplies the tracking result to the output unit 160. It is assumed that the tracking result to be supplied to the output unit 160 by the tracking unit 140 includes, for example, the tracking ID 51, the object region 53 and the number of persons 57. The tracking result to be supplied to the output unit 160 by the tracking unit 140 may include other information. Further, the tracking unit 140 may supply the input image to the output unit 160 along with the tracking result.

Specific processing of the tracking unit 140 will be described using other drawings.

The output unit 160 receives the tracking result from the tracking unit 140. The output unit 160 displays the tracking result, for example, on a display screen. The output unit 160 is realized with, for example, a display apparatus. The output unit 160 may be a software module to display the tracking result on a display screen.

While, in the present exemplary embodiment, description will be provided assuming that the output unit 160 is a display apparatus, the output unit 160 may be a drive circuit which drives a display apparatus. Further, the output unit 160 may be realized with an apparatus different from the image processing apparatus 100. In the case where the output unit 160 displays the tracking result on the display screen, the output unit 160 may display the tracking result which is superimposed on the input image. An example of a screen displayed by the output unit 160 will be described later.

Further, the output unit 160 may output the object region, the tracking ID and the number of persons which are the tracking result, the total number of tracked persons obtained from the tracking information 151, or the like, to other terminals, a file, or the like, as text data. In the case where the output unit 160 outputs a file, the file may be stored in the storage unit 150 or may be stored in other storage apparatuses. By the output unit 160 outputting the tracking result to a file, the tracking result is accumulated as data after the tracking processing. The data accumulated in this manner can be effectively utilized to recognize the number of passersby, a traffic route, or the like.

Figure 6:
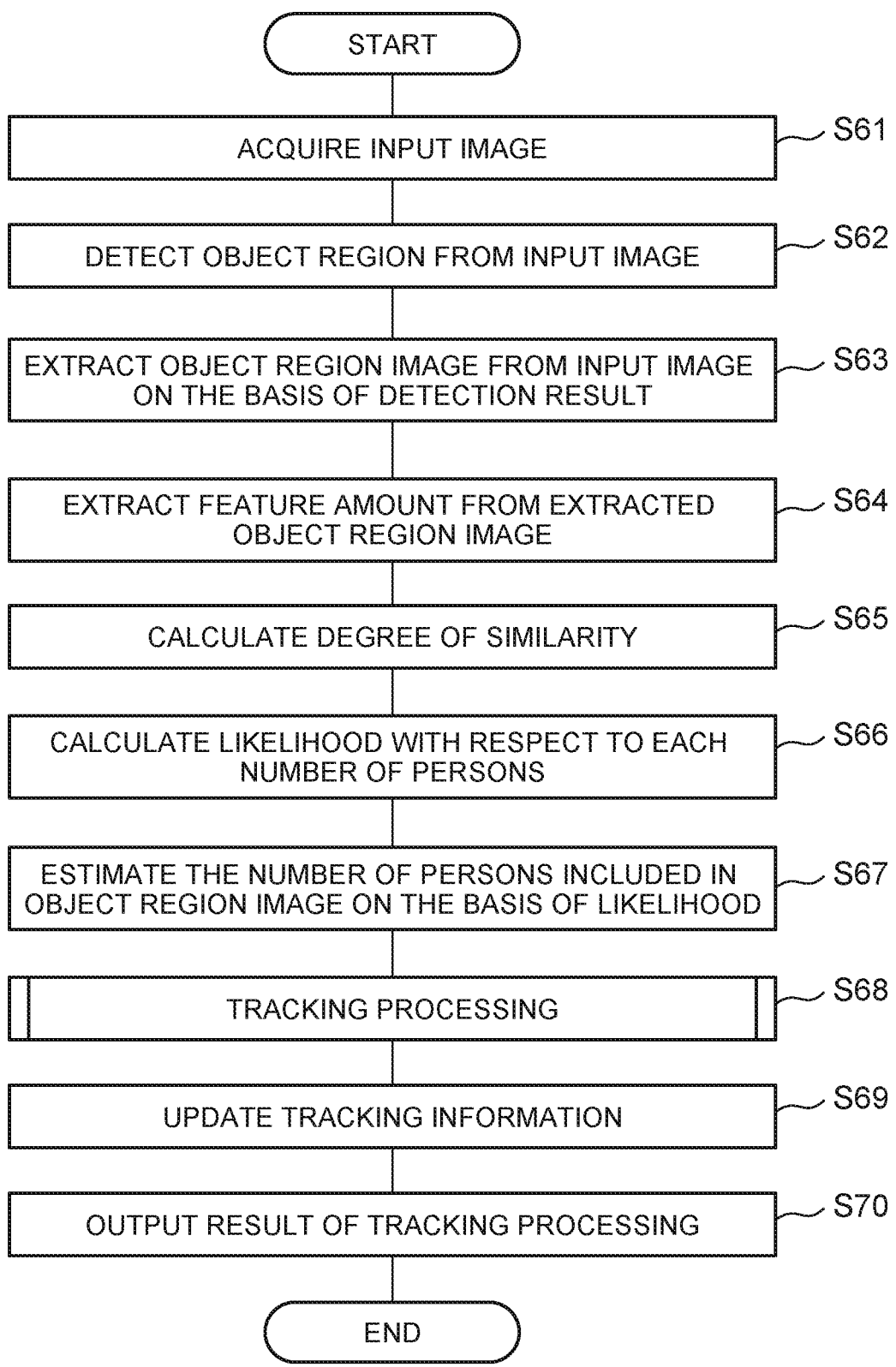
FIG. 6 is a flowchart illustrating an example of flow of processing of the image processing apparatus according to the first exemplary embodiment.

Flow of processing of the image processing apparatus 100 according to the present exemplary embodiment will be described with reference to FIG. 6. FIG. 6 is a flowchart illustrating an example of the flow of the processing of the image processing apparatus 100 according to the present exemplary embodiment.

The image acquiring unit 110 acquires an input image (step S61). The detecting unit 120 detects an object region indicating a region of a person from the input image (step S62).

The estimating unit 130 extracts an object region image from the input image on the basis of the detection result (step S63). The estimating unit 130 extracts a feature amount from the extracted object region image (step S64).

The estimating unit 130 calculates a degree of similarity with data stored in the image DB 152 using the data stored in the image DB 152 and the feature amount extracted in step S64 (step S65). The estimating unit 130 then calculates a likelihood with respect to each number of persons using the calculated degree of similarity (step S66). The estimating unit 130 estimates a number of persons included in the object region image extracted in step S63 on the basis of the calculated likelihood (step S67).

The tracking unit 140 performs tracking processing using the tracking information 151 and the estimated number of persons (step S68). The tracking processing in step S68 will be described in detail using other drawings.

The tracking unit 140 updates the tracking information 151 on the basis of the result of the tracking processing (step S69). Subsequently, the output unit 160 outputs the result of the tracking processing (step S70). The image processing apparatus 100 finishes the processing as described above.

Figure 7:
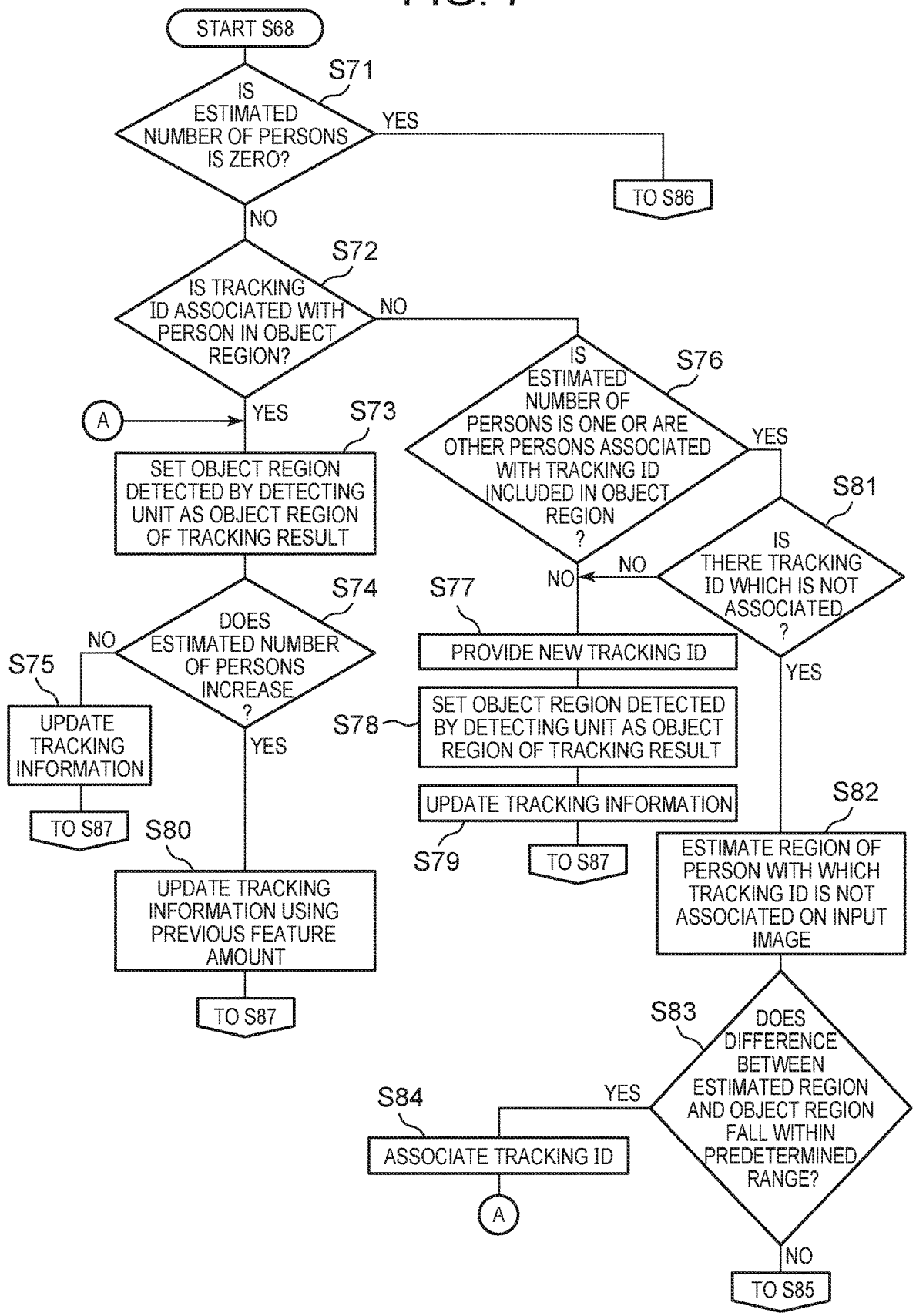
FIG. 7 is a flowchart illustrating an example of flow of tracking processing at a tracking unit of the image processing apparatus according to the first exemplary embodiment.
Figure 16:
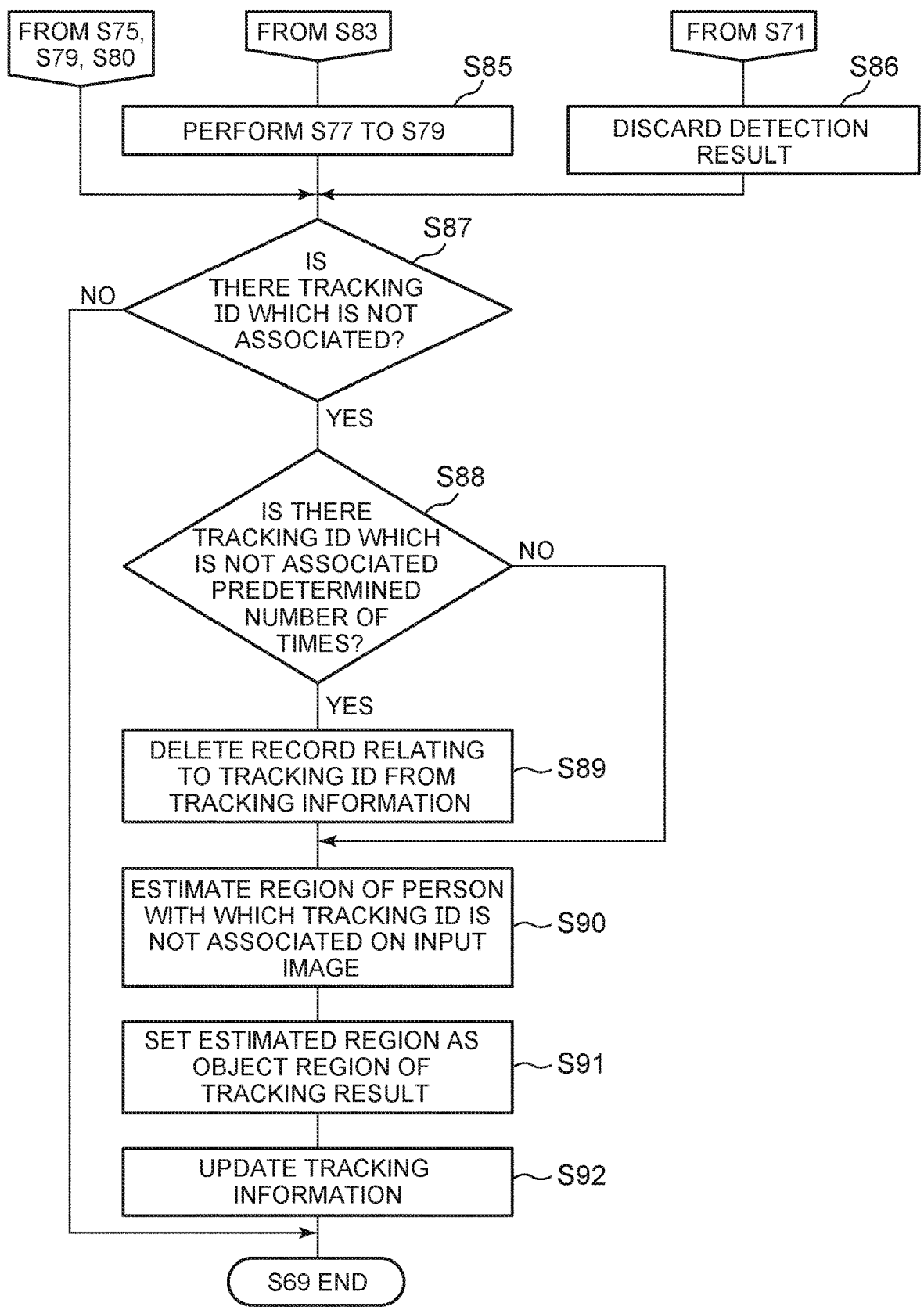
FIG. 16 is a flowchart illustrating an example of flow of tracking processing at the tracking unit of the image processing apparatus according to the first exemplary embodiment.

The tracking processing in step S68 will be described with reference to FIG. 7 and FIG. 16. FIG. 7 and FIG. 16 are flowcharts illustrating an example of flow of the tracking processing of the tracking unit 140.

When the tracking unit 140 receives the estimated number of persons with respect to respective object regions detected from the input image from the estimating unit 130, the tracking unit 140 performs the tracking processing illustrated in FIG. 7 and FIG. 16. The tracking unit 140 performs the processing from step S71 to step S86 on each object region and performs processing from step S87 to step S92 on the tracking ID 51 included in the tracking information 151.

The tracking unit 140 determines whether or not the estimated number of persons in the object region to be subjected to processing is zero (step S71). In the case where the estimated number of persons is zero (step S71: Yes), the processing proceeds to step S86 in FIG. 16. In the case where the estimated number of persons is equal to or larger than one (step S71: No), the processing proceeds to step S72.

The tracking unit 140 performs the following processing from step S72 to step S85 for each person included in the object region to be subjected to processing. In the case where the estimated number of persons in the object region to be subjected to processing is one, the tracking unit 140 tracks the one person by employing the above-described tracking method and determining whether or not the person is associated with one of the tracking IDs 51 included in the tracking information 151 with reference to the tracking information 151. Further, in the case where the estimated number of persons in the object region to be subjected to processing is equal to or larger than two, the tracking unit 140 tracks the persons by determining whether or not the person is associated with one of the tracking IDs 51 included in the tracking information 151 for each of the persons (step S72).

In the case where the person included in the object region to be subjected to processing is associated with one of the tracking IDs 51 included in the tracking information 151 (step S72: Yes), the object region information included in the detection result 21 is made the object region 53 of the tracking result (step S73). It is determined whether or not the estimated number of persons is larger than the number of persons 57 by comparing the number of persons 57 associated with the tracking ID 51 associated with the person included in the object region to be subjected to processing, included in the tracking information 151 with the estimated number of persons estimated by the estimating unit 130 (step S74).

In the case where the estimated number of persons is the same as or smaller than the number of persons 57 of the tracking information 151 (step S74: No), the tracking unit 140 includes the feature amount extracted by the estimating unit 130 into the tracking result and updates the tracking information 151 (step S75). The processing then proceeds to step S87.

The processing from step S71 to step S75 will be further described using FIG. 5 and FIG. 8 to FIG. 13.

Figure 8:
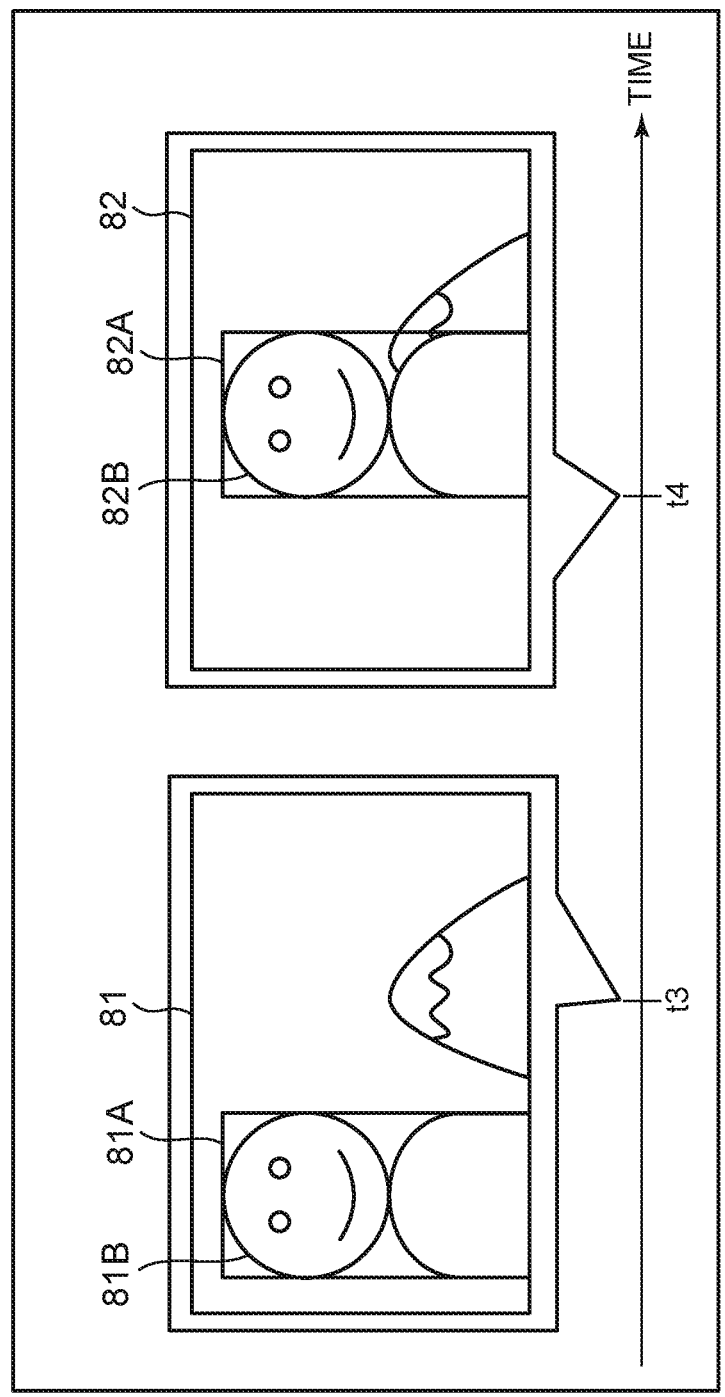
FIG. 8 is a diagram illustrating an example of an input image and an input image which is temporally adjacent to the input image and which is input prior to the input image.

FIG. 8 is a diagram illustrating an example of an input image (referred to as a current frame) and an input image (referred to as a previous frame) temporally previously adjacent to the input image. FIG. 8 indicates time on the horizontal axis. The previous frame 81 is an image whose image ID is "IM04", and which is picked up at time t3, and the current frame 82 is an image whose image ID is "IM05", and which is picked up at time t4.

It is assumed that the object region 81A is detected from the previous frame 81 by the detecting unit 120, and the person 81B is included in the object region 81A. The object region 81A is a region indicated by the object region 53 relating to the time 52 of "t3" illustrated in FIG. 5. Referring to FIG. 5, as indicated by a record of the time 52 of "t3" included in the tracking information 151, the region indicated by the object region 53 includes one person.

It is assumed that the detecting unit 120 detects the object region 82A from the current frame 82, and the estimating unit 130 estimates the estimated number of persons in the object region 82A is one. That is, the object region to be subjected to processing is the object region 82A. Because the estimated number of persons in the object region 82A is one, step S71 is No, and the tracking unit 140 makes the processing proceed to step S72.

When it is assumed that the one person included in the object region 82A is the person 82B, the tracking unit 140 determines whether or not the person 82B included in the object region 82A is associated with the tracking ID 51 included in the tracking information 151 with reference to the tracking information 151 which is accumulated data of the tracking results of input images until time t3 (step S72). In the present example, when it is assumed that the person 82B is associated with the tracking ID 51 of "a1", the tracking unit 140 makes the processing proceed to step S73.

The tracking unit 140 sets "a1" as the tracking ID 51 of the tracking result with respect to the person 82B included in the object region 82A to be tracked, and sets the object region information included in the detection result 21 detected by the detecting unit 120 as the object region 53 of the tracking result (step S73). It is determined whether or not the estimated number of persons increases from the number of persons 57 (step S74). Because the estimated number of persons is one and the number of persons 57 included in the tracking information 151 is also "1", the estimated number of persons is the same as the number of persons 57 included in the tracking information 151. Therefore, the tracking unit 140 makes the processing proceed to step S75.

The tracking unit 140 sets the feature amount extracted by the estimating unit 130 as the feature amount 59 of the tracking result and updates the tracking information 151 (step S75).

FIG. 9 is a diagram illustrating an example of the tracking information 151A after the tracking information 151 is updated in step S75. The tracking information 151A is obtained by adding a record 91 to the tracking information 151 illustrated in FIG. 5. The record 91 is the tracking result with respect to the person 82B included in the object region 82A to be tracked. As illustrated in FIG. 9, the tracking ID 51 of the record 91 is "a1" set in step S73. Further, as described above, because the current frame 82 is an image whose image ID is "IM05", and which is picked up at time t4, the record 91 includes "t4" as the time 52 and includes "IM05" as the image ID 58. Further, the record 91 includes the object region information included in the detection result 21 as the object region 53. Still further, the record 91 includes the feature amount extracted by the estimating unit 130 from the object region image which is an image of the object region detected by the detecting unit 120 as the feature amount 59. The tracking unit 140 updates the tracking information 151 by adding the tracking result indicated with such a record 91 to the tracking information 151.

While a case has been described using FIG. 8 and FIG. 9 where the estimated number of persons included in the object region is one, the tracking unit 140 performs tracking through similar processing even in the case where the estimated number of persons is equal to or larger than two.

Figure 11:
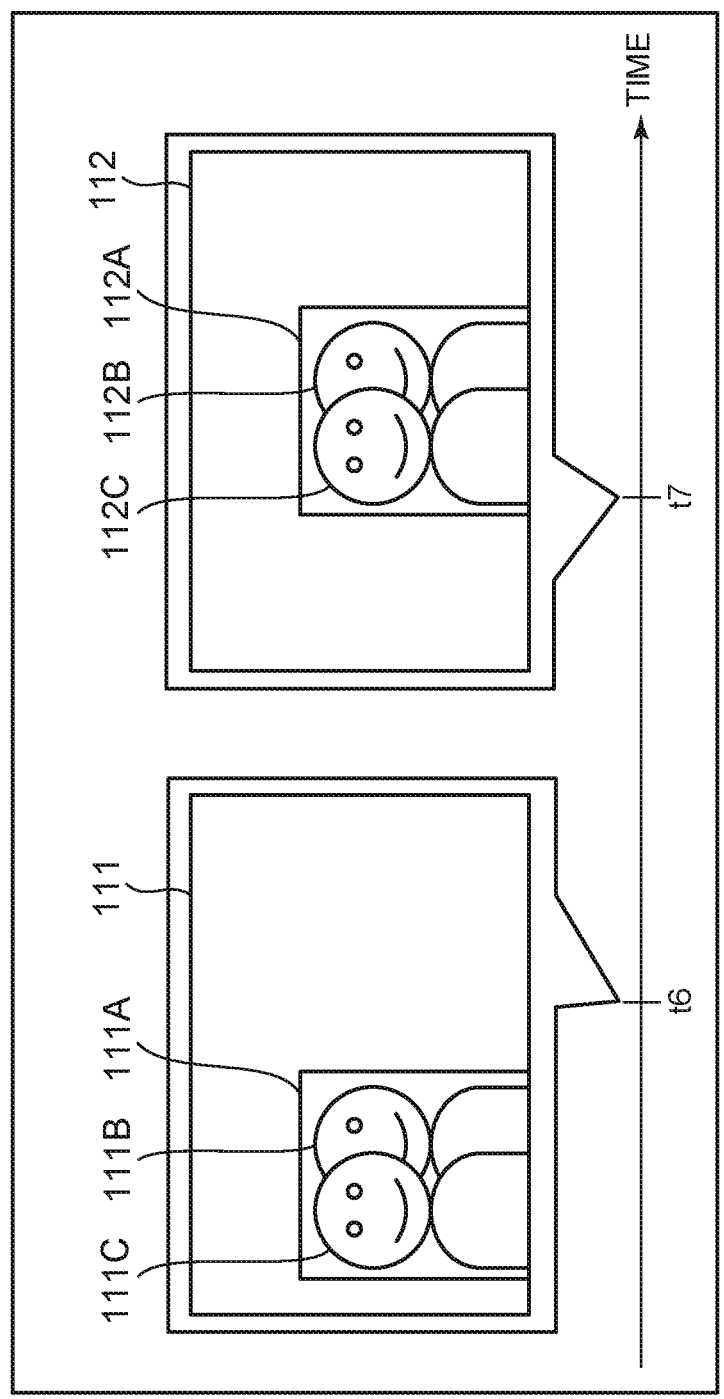
FIG. 11 is a diagram illustrating an example of an input image in the case where the estimated number of persons included in the object region is two and an input image which is temporally adjacent to the input image and which is input prior to the input image.

The tracking information 151B illustrated in FIG. 10 is an example of the tracking information in the case where the estimated number of persons included in the object region is two. Further, FIG. 11 is a diagram illustrating an example of an input image (current frame) in the case where the estimated number of persons included in the object region is two, and the previous frame. FIG. 11 indicates time on the horizontal axis. The previous frame 111 is an image whose image ID is "IM26", and which is picked up at time t6, and the current frame 112 is an image whose image ID is "IM27", and which is picked up at time t7.

It is assumed that, before step S71, the tracking information 151B includes records 101A, 101B, 101C and 101D. Referring to FIG. 10, as indicated by the record 101C and the record 101D whose time 52 is "t6", the region indicated by the object region 53 includes two persons.

The object region 53 included in the record 101C and the record 101D is information indicating the object region 111A in FIG. 11. The feature amount is extracted by the estimating unit 130 for each object region. Therefore, the record 101C and the record 101D which indicate the same object region includes "F6" which is the same feature amount 59. As illustrated in FIG. 11, the object region 111A includes a person 111B and a person 111C. While, in the tracking information 151B illustrated in FIG. 10, "a2" of the tracking ID 51 indicates one of the person 111B and the person 111C, "a2" may specify one of them or does not have to specify one of them. That is, "a2" of the tracking ID 51 may specify, for example, the person 111B or does not have to specify the person 111B. In the present exemplary embodiment, description will be provided assuming that, in the case where a plurality of persons are included in one object region, a tracking ID of each of the persons is not specified. That is, it is assumed that, in the present exemplary embodiment, while two persons whose tracking IDs 51 are "a2" and "b2" are included in the object region 111A, which of the person 111B and the person 111C is indicated with each of the tracking IDs is not specified. That is, it can be said that the tracking IDs 51 corresponding to the number of persons estimated to be included in the object region are associated with the object region. It can be said that the feature amount 59 is associated with the object region 53.

It is assumed that the detecting unit 120 detects the object region 112A from the current frame 112, and the estimating unit 130 estimates that the estimated number of persons in the object region 112A is two. Because the estimated number of persons in the object region 112A is two, step S71 is No, and the processing of the tracking unit 140 with respect to the object region 112A to be subjected to processing proceeds to step S72.

The tracking unit 140 determines whether or not the person 112B included in the object region 112A is associated with the tracking ID 51 with reference to the tracking information 151B (step S72). The tracking unit 140 tracks the person included in the object region 112A by tracking an object region using "F6" which is the feature amount 59 associated with the tracking IDs 51 of both "a2" and "b2" and the feature amount extracted in step S64 from the object region 112A. It is assumed that, in the present example, the person 112B is associated with the tracking IDs 51 of "a2" and "b2". The tracking unit 140 makes the processing proceed to step S73.

The tracking unit 140 sets the tracking ID 51 of the tracking result with respect to the person 112B included in the object region 112A to be tracked as one of "a2" and "b2" (here, "a2"), and sets the object region 53 as the object region information included in the detection result 21 detected by the detecting unit 120 (step S73). It is then determined whether or not the estimated number of persons increases from the number of persons 57 (step S74). Because the estimated number of persons is two and the number of persons 57 included in the tracking information 151 is also "2", the estimated number of persons is the same as the number of persons 57 included in the tracking information 151. Therefore, the tracking unit 140 makes the processing proceed to step S75. Because the number of persons does not change, and, thus, the tracking result with respect to the person 112C included in the object region 112A becomes a tracking result similar to the tracking result with respect to the person 112B, the processing from step S72 to step S74 can be omitted for the person 112C.

Therefore, the tracking unit 140 updates the tracking information 151B by inserting the record 101E and the record 102F to the tracking information 151B including records of the records 101A to 101D as the tracking result of the person 112B and the person 112C included in the object region 112A (step S75). By this means, the tracking information 151B illustrated in FIG. 10 is stored in the storage unit 150.

The record 101E is different from the record 101F only in the tracking IDs 51. That is, in the case where a plurality of persons are included in a certain object region, the tracking IDs 51 corresponding to the number of persons are associated with the object region.

In this manner, in the case where a plurality of persons are included in the object region, it is possible to track the object region by associating the tracking IDs 51 corresponding to the plurality of persons with the object region instead of associating the tracking IDs with individual persons. By this means, even in the case where feature amounts of individual persons required for tracking cannot be extracted under a crowded environment, because it is possible to perform tracking while overlapping of the persons is taken into account, it is possible to reduce discontinuity, or the like, of tracking in the case where individual objects are tracked.

In the following description, a case will be described where the number of persons estimated for the object region included in the input image is different from the number of persons estimated for the object region included in the input image (also referred to as a past input image) temporally prior to the input image.

Figure 12:
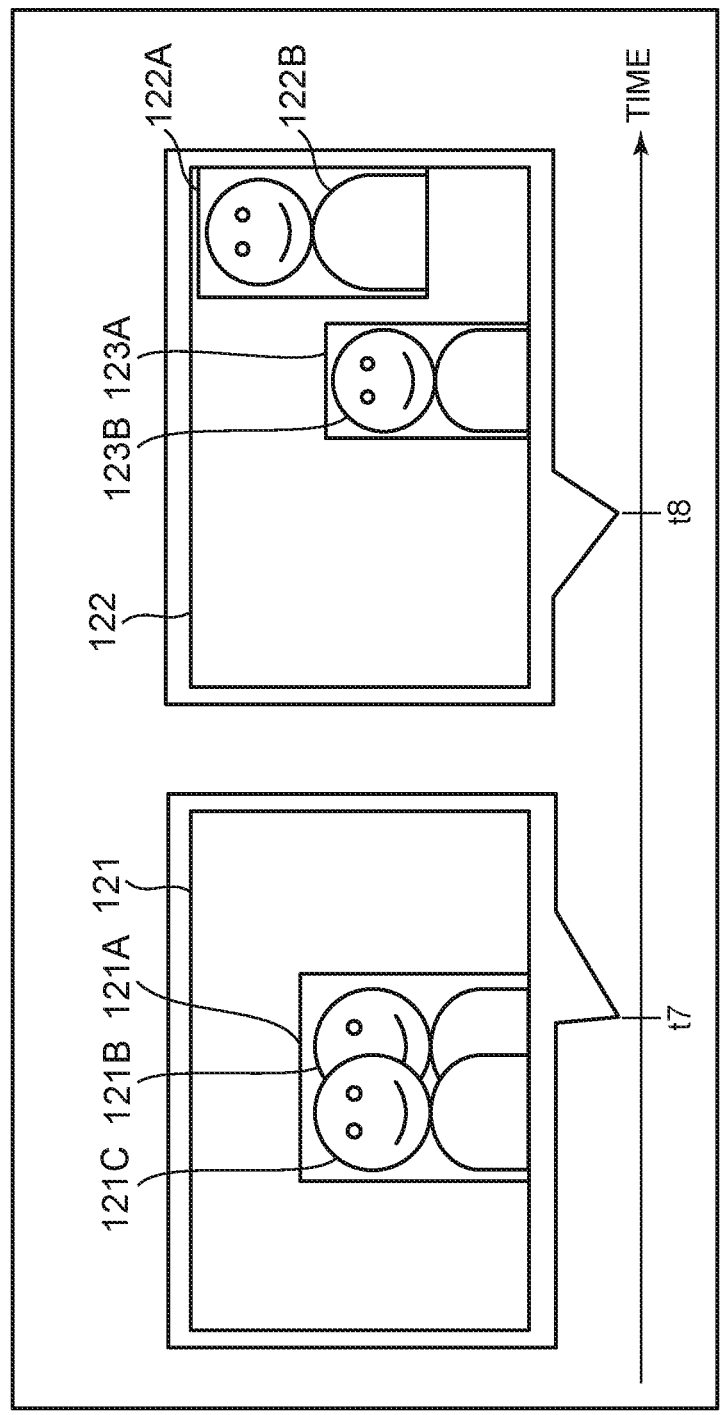
FIG. 12 is a diagram illustrating another example of the input image and the input image which is temporally adjacent to the input image and which is input prior to the input image.

FIG. 12 is a diagram illustrating another example of an input image (current frame) and an input image (previous frame) temporally previously adjacent to the input image. FIG. 12 indicates time on the horizontal axis. The previous frame 121 is an image whose image ID is "IM27", and which is picked up at time t7 in a similar manner to the current frame 112 in FIG. 11. Further, the current frame 122 is an image whose image ID is "IM28", which is picked up at time t8.

It is assumed that the detecting unit 120 detects an object region 121A from the previous frame 121, and the object region 121A includes a person 121B and a person 121C. The object region 121A is a region indicated by the object region 53 relating to the time 52 of "t7" illustrated in FIG. 10.

It is assumed that the detecting unit 120 detects the object region 122A and the object region 123A from the current frame 122, and the estimating unit 130 estimates that the estimated number of persons in the object region 122A and the estimated number of persons in the object region 123A are respectively one. That is, the object regions to be subjected to processing become the object region 122A and the object region 123A. Because, as described above, the processing from step S71 is performed for each object region, the tracking unit 140 performs processing on the object region 122A and processing on the object region 123A. Because the estimated number of persons in the object region 122A is one, step S71 is No, and the tracking unit 140 makes the processing on the object region 122A proceed to step S72. In a similar manner, because the estimated number of persons in the object region 123A is also one, step S71 is No, and the tracking unit 140 also makes the processing on the object region 123A proceed to step S72.

The tracking unit 140 determines whether or not the person 122B included in the object region 122A is associated with the tracking ID 51 with reference to the tracking information 151B which is one example of the tracking information 151 (step S72). In the present example, it is assumed that the person 122B is associated with the tracking IDs 51 of "a2" and "b2". The tracking unit 140 makes the processing on the person 122B included in the object region 122A proceed to step S73. In a similar manner, the tracking unit 140 determines whether or not the person 123B included in the object region 123A is associated with the tracking ID 51 with reference to the tracking information 151B (step S72). In the present example, it is assumed that the person 123B is associated with the tracking IDs 51 of "a2" and "b2". The tracking unit 140 makes the processing on the person 123B included in the object region 123A proceed to step S73.

The tracking unit 140 sets the tracking ID 51 of the tracking result with respect to the person 122B included in the object region 122A to be tracked as one of "a2" and "b2" (here, "a2") and sets the object region 53 as the object region information with respect to the object region 122A included in the detection result 21 detected by the detecting unit 120 (step S73). The tracking unit 140 may determine which of "a2" and "b2" is set as the tracking ID 51 by referring to respective past tracking information. It is then determined whether or not the estimated number of persons increases from the number of persons 57 (step S74). Because the estimated number of persons is one and the number of persons 57 included in the tracking information 151 is "2", the estimated number of persons is smaller than the number of persons 57 included in the tracking information 151. Therefore, the tracking unit 140 makes the processing on the person 122B included in the object region 122A proceed to step S75. The tracking unit 140 sets the feature amount extracted from the object region 122A by the estimating unit 130 as the feature amount 59 of the tracking result and updates the tracking information 151B by adding a record relating to the tracking ID 51 of "a2" (step S75).

In a similar manner, the tracking unit 140 sets the tracking ID 51 of the tracking result with respect to the person 123B included in the object region 123A to be tracked as "b2" and sets the object region 53 as the object region information with respect to the object region 123A included in the detection result 21 detected by the detecting unit 120 (step S73). It is then determined whether or not the estimated number of persons increases from the number of persons 57 (step S74). Because the estimated number of persons is one and the number of persons 57 included in the tracking information 151 is "2", the estimated number of persons is smaller than the number of persons 57 included in the tracking information 151. Therefore, the tracking unit 140 makes the processing with respect to the person 123B included in the object region 123A proceed to step S75. The tracking unit 140 sets the feature amount extracted from the object region 123A by the estimating unit 130 as the feature amount 59 of the tracking result and updates the tracking information 151B by adding a record relating to the tracking ID 51 of "b2" (step S75).

FIG. 13 is a diagram illustrating an example of the tracking information 151C after the tracking information 151B is updated in step S75. The tracking information 151C is information obtained by adding a record 101G and a record 101H to the tracking information 151B illustrated in FIG. 10. The record 101G is a tracking result with respect to the person 122B included in the object region 122A to be tracked. As illustrated in FIG. 13, the tracking ID 51 of the record 101G is "a2" set in step S73. Further, as described above, because the current frame 122 is an image whose image ID is "IM28", and which is picked up at time t8, the record 91 includes "t8" as the time 52, and "IM28" as the image ID 58. Further, the record 91 includes the object region information included in the detection result 21 as the object region 53. Still further, the record 91 includes the feature amount extracted by the estimating unit 130 from the object region image which is an image of the object region 122A, detected by the detecting unit 120, as the feature amount 59.

The record 101H, which is a record whose tracking ID 51 is "b2", includes "t8" as the time 52 and includes "IM28" as the image ID 58. Further, the record 101H includes the object region information included in the detection result 21 as the object region 53. Still further, the record 101H includes the feature amount extracted by the estimating unit 130 from the object region image which is an image of the object region 123A, detected by the detecting unit 120, as the feature amount 59.

It can be understood that the feature amount 59 of the record 101G changes compared to that of the record 101E which is the latest record, and which has the same tracking ID 51. In a similar manner, the feature amount 59 of the record 101H changes from that of the record 101F. The tracking unit 140 updates the tracking information 151 by adding the tracking result indicated with such a record 101G and a record 101H to the tracking information 151.

In this manner, the tracking unit 140 associates the feature amount extracted from the object region 122A as the tracking result with respect to the person 122B with the object region 122A in the case where the number of objects 57 estimated with respect to the object region 122A (first object region) on the current frame 122 including the tracked person 122B is equal to or smaller than the number of objects 57 estimated with respect to the object region 121A (second object region) in the previous frame 121 which is an input image temporally the closest to the current frame 122 among the tracking information 151B.

By this means, even in the case where there is no longer overlapping of persons on the input image, it is possible to perform tracking from when the persons are included on the input image instead of from when there is no longer overlapping. By this means, the image processing apparatus 100 can perform tracking without chronological missing parts. Further, in the case where there is no longer overlapping of persons, by updating the feature amount of the person, it is possible to extract the feature amount of the person more accurately. Therefore, the image processing apparatus 100 can improve tracking accuracy.

Returning to the flowchart in FIG. 7, processing of the tracking unit 140 in the case where step S72 is No will be described. In the case where the person included in the object region to be subjected to processing is not associated with any of the tracking ID 51 included in the tracking information 151 (step S72: No), the tracking unit 140 determines whether or not the estimated number of persons in the object region including the person with which the tracking ID 51 is not associated is one or whether or not the object region including the person with which the tracking ID 51 is not associated includes other persons associated with the tracking ID 51 (step S76). In the case where the estimated number of persons in the object region including the person with which the tracking ID 51 is not associated is not one, and other persons which are associated with the tracking ID 51 are not included in the object region which is the same as that of the person which is not associated with the tracking ID 51 (step S76: No), the tracking unit 140 judges that the person included in this object region is a person who newly appears on the input image, and provides a new tracking ID 51 to the person (step S77). The tracking unit 140 then sets the object region information included in the detection result 21 as the object region 53 of the tracking result in a similar manner to step S73 (step S78) and updates the tracking information 151 by adding a record to which the new tracking ID 51 is provided to the tracking information 151 (step S79). Subsequently, the tracking unit 140 makes the processing proceed to step S87.

Figure 14:
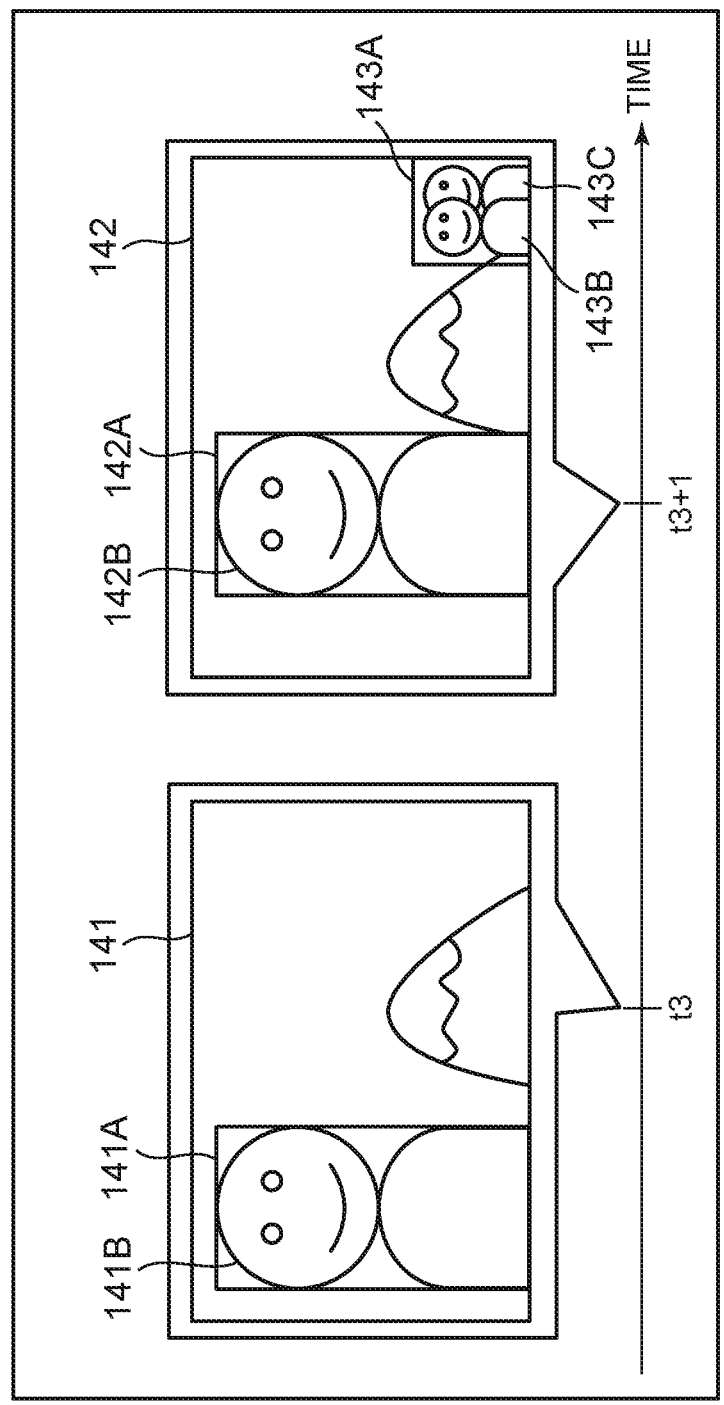
FIG. 14 is a diagram illustrating another example of the input image and the input image which is temporally adjacent to the input image and which is input prior to the input image.

The processing in step S71, step S72, and step S76 to step S79 will be further described using FIG. 5, FIG. 14 and FIG. 15.

FIG. 14 is a diagram illustrating another example of the input image (current frame) and the input image (previous frame) temporally previously adjacent to the input image. FIG. 14 indicates time on the horizontal axis. It is assumed that the previous frame 141 is an image whose image ID is "IM04", and which is picked up at time t3 in a similar manner to the previous frame 81 in FIG. 8, and the current frame 142 is an image whose image ID is "IM06", and which is picked up at time t3+1.

It is assumed that the detecting unit 120 detects an object region 141A from the previous frame 141, and the object region 141A includes a person 141B. The object region 121A is a region indicated with the object region 53 relating to the time 52 of "t3" illustrated in FIG. 5. Referring to FIG. 5, as indicated with a record whose time 52 is "t3" included in the tracking information 151, the region indicated with the object region 53 includes one person.

It is assumed that the detecting unit 120 detects the object region 142A and the object region 143A from the current frame 122, and the estimating unit 130 estimates that the estimated number of persons in the object region 142A is one, and the estimated number of persons in the object region 143A is two. That is, the object regions to be subjected to processing are the object region 142A and the object region 143A. Because the processing from step S71 is performed for each object region as described above, the tracking unit 140 performs processing on the object region 142A and processing on the object region 143A. Because the estimated number of persons in the object region 142A is one, step S71 is No, and, thus, the tracking unit 140 makes the processing with respect to the object region 142A proceed to step S72. In a similar manner, because the estimated number of persons in the object region 143A is two, step S71 is No, and, thus, the tracking unit 140 also makes the processing with respect to the object region 143A proceed to step S72.

As described above, the processing after step S72 is performed for each person included in the object region. The processing with respect to the person included in the object region 142A will be described.

When the one person included in the object region 142A is the person 142B, the tracking unit 140 determines whether or not the person 142B included in the object region 142A is associated with the tracking ID 51 included in the tracking information 151 with reference to the tracking information 151 which is data of accumulated tracking results of the input images until time t3 (step S72). In the present example, if it is assumed that the person 142B is associated with the tracking ID 51 of "a1", the tracking unit 140 makes the processing proceed to step S73. In a similar manner to the processing described using FIG. 8, the tracking unit 140 sets "a1" as the tracking ID 51 of the tracking result with respect to the person 142B included in the object region 142A to be tracked, and sets the object region information included in the detection result 21 detected by the detecting unit 120 as the object region 53 of the tracking result (step S73). It is then determined whether or not the estimated number of persons increases from the number of persons 57 (step S74). Because the estimated number of persons is one and the number of persons 57 included in the tracking information 151 is also "1", the estimated number of persons is the same as the number of persons 57 included in the tracking information 151. Therefore, the tracking unit 140 sets the feature amount extracted by the estimating unit 130 as the feature amount 59 of the tracking result and updates the tracking information 151 (step S75).

The processing with respect to the person included in the object region 143A will be described. When the two persons included in the object region 143A are respectively the person 143B and the person 143C, the tracking unit 140 determines whether or not the person 143B is associated with the tracking ID 51 included in the tracking information 151 with reference to the tracking information 151. In a similar manner, the tracking unit 140 determines whether or not the person 143C is associated with the tracking ID 51 included in the tracking information 151 (step S72). In the present example, it is assumed that neither the person 143B nor the person 143C is associated with any of the tracking ID 51. In this case, the tracking unit 140 makes both of the processing with respect to the person 143B and the processing with respect to the person 143C proceed to step S76.

The tracking unit 140 determines whether the estimated number of persons in the object region including the person with which the tracking ID 51 is not associated is not one and whether or not the object region including the person with which the tracking ID 51 is not associated includes other persons associated with the tracking ID 51 (step S76). In the case of the present example, because the estimated number of persons is two and neither the person 143B nor the person 143C is associated with any tracking ID 51, the object region does not include other persons associated with the tracking ID. Therefore, the tracking unit 140 makes both of the processing with respect to the person 143B and the processing with respect to the person 143C proceed to step S77. The tracking unit 140 then judges that the persons included in this object region are persons who newly appear on the input image and provides new tracking IDs 51 to the respective persons (step S77). That is, the tracking unit 140 provides tracking IDs 51 to all the persons (the person 143B and the person 143C) included in the object region 143A. By this means, even in a crowded environment where respective persons largely overlap with each other, it is possible to perform tracking corresponding to the number of persons. Therefore, according to the image processing apparatus 100 according to the present exemplary embodiment, it is possible to perform tracking without missing. As described above, in the case where a plurality of persons are included in the same object region, it is not necessary to specify tracking IDs of respective persons. Any of the tracking IDs 51 ("b1" or "c1") may be provided to any of the person 123B and the person 123C. That is, it is only necessary to associate the tracking IDs 51 corresponding to the number of persons included in the object region 143A (in the present example, two) with the object region 143A.

The tracking unit 140 sets the object region information included in the detection result 21 as the object region 53 of the tracking result in a similar manner to step S73 (step S78) and updates the tracking information 151 by adding a record whose tracking ID 51 is "b1" and a record whose tracking ID 51 is "c1" to the tracking information 151 (step S79).

FIG. 15 is a diagram illustrating an example of the tracking information 151D after the tracking information 151 is updated in step S75 and step S79. The tracking information 151D is information obtained by adding a record 131A, a record 131B and a record 131C to the tracking information 151 illustrated in FIG. 5. The record 131A is a tracking result with respect to the person 142B included in the object region 142A to be tracked, and a record added in step S75. As illustrated in FIG. 15, the tracking ID 51 of the record 131A is "a1" set in step S73. Further, as described above, because the current frame 142 is an image whose image ID is "IM06", and which is picked up at time t3+1, the record 131A includes "t3+1" as the time 52, and includes "IM06" as the image ID 58. Further, the record 131A includes the object region information included in the detection result 21 as the object region 53. Still further, the record 131A includes the feature amount extracted by the estimating unit 130 from the object region image which is an image of the object region 142A detected by the detecting unit 120, as the feature amount 59.

The record 131B and the record 131C are tracking results with respect to the person 143B and the person 143C included in the object region 143A to be tracked, and records added in step S79. As illustrated in FIG. 13, the tracking IDs 51 of the record 131B and the record 131C are respectively "b1" and "c1" newly provided in step S77. Further, as described above, because the current frame 142 is an image whose image ID is "IM06", and which is picked up at time t3+1, the record 131B and the record 131C include "t3+1" as the time 52 and includes "IM06" as the image ID 58. Further, the record 131B and the record 131C include the object region information included in the detection result 21 as the object region 53. Further, the record 131B and the record 131C include the feature amount extracted by the estimating unit 130 from the object region image which is an image of the object region 143A detected by the detecting unit 120, as the feature amount 59. In the case where a plurality of persons are included in a certain object region, because the tracking IDs 51 corresponding to the number of persons are associated with the object region, the record 131B are different from the record 131C only in the tracking ID 51.

In this manner, the tracking unit 140 updates the tracking information 151D by inserting the record 131A to the record 131C to the tracking information 151 illustrated in FIG. 5 as the tracking result of the person 142B included in the object region 142A and the person 143B and the person 143C included in the object region 143A.

Returning to the flowchart in FIG. 7, processing in the case where step S74 of the processing of the tracking unit 140 is Yes will be described. In the case where the estimated number of persons is larger than the number of persons 57 when the number of persons 57 associated with the tracking ID 51 associated with the person included in the object region to be subjected to processing included in the tracking information 151 is compared with the estimated number of persons estimated by the estimating unit 130 (step S74: Yes), the tracking unit 140 makes the processing proceed to step S80.

The tracking unit 140 updates the tracking information 151 by adding a record relating to the tracking ID 51 in which the feature amount in the previous frame of the tracking ID 51 associated in step S72 is made the feature amount 59 of the tracking result (step S80). That is, the tracking unit 140 does not update the feature amount 59 from the record having the same tracking ID in the record to be newly added to the tracking information 151. By this means, even in the case where a person to be tracked enters a crowded environment, the tracking unit 140 can prevent a situation where tracking cannot be performed as a result of the feature amount of the person being lost by the entry into the crowded environment. The tracking unit 140 then makes the processing proceed to step S87 in FIG. 16.

Further, in the case where step S76 is Yes, that is, in the case where the object region including a person with which the tracking ID 51 is not associated includes other persons associated with the tracking ID 51, or in the case where the estimated number of persons in the object region including a person with which the tracking ID 51 is not associated is one, the tracking unit 140 performs processing in step S81. The tracking unit 140 determines whether or not there is a tracking ID 51 which is not associated with any of the persons included in the input image among the tracking IDs 51 included in the tracking information 151 (step S81).

There is a possibility that the person which is not associated with the tracking ID 51 overlaps with other persons or objects by, for example, moving to a crowded environment, or the like, the feature amount of the person which is not associated with the tracking ID 51 cannot be extracted, and a tracking ID 51 is not provided to the person. Therefore, in the case where other tracked persons are included in the same object region as the object region of the person with which the tracking ID 51 is not associated and there exists a tracking ID 51 not associated with any of the persons included in the input image, there is a possibility that the person with which the tracking ID 51 is not associated may be associated with the tracking ID 51 not associated with a person. Therefore, in the case where there is a tracking ID 51 not associated with any of the persons included in the input image (step S81: Yes), the tracking unit 140 estimates a region of the person on the input image on the basis of a record relating to the tracking ID 51 not associated with a person with reference to the tracking information 151 (step S82).

The tracking unit 140 determines whether or not a difference between the object region and the estimated region falls within a predetermined range by comparing the object region including the person with which the tracking ID 51 is not associated with the region which is estimated (referred to as the estimated region) (step S83). In the case where the difference between the object region and the estimated region falls within the predetermined range (step S83: Yes), it is judged that the person with which the tracking ID 51 is not associated is associated with the tracking ID 51 not associated with a person, and associates the tracking ID 51 with the person with which the tracking ID 51 is not associated in step S72 (step S84). The tracking unit 140 makes the processing proceed to the above-described step S73.

In the case where there is no tracking ID 51 not associated with any of the persons included in the input image (step S81: No), because the person with which the tracking ID 51 is not associated is a person newly included in the input image, the tracking unit 140 makes the processing proceed to step S77.

In the case where the difference between the object region and the estimated region is not within the predetermined range (step S83: No), the tracking unit 140 makes the processing proceed to step S85 in FIG. 16.

In the case where the difference between the object region and the estimated region is not within the predetermined range, because the person with which the tracking ID 51 is not associated is highly likely to be a person newly included in the input image, the tracking unit 140 performs step S77 to step S79 to update the tracking information 151 by providing a new tracking ID 51 to the person with which the tracking ID 51 is not associated (step S85). The tracking unit 140 makes the processing proceed to step S87.

Further, in the case where step S71 is Yes, because it is estimated that the input image does not include a person, the tracking unit 140 discards the detection result detected with respect to the input image (step S86).

After the above-described processing is performed for all the object regions, that is, after step S75, step S79, step S80, step S85 and step S86 are finished, the tracking unit 140 determines whether or not there is a tracking ID 51 with which a person is not associated with reference to the tracking information 151 (step S87). In the case where step S81 is performed, this processing of step S87 may be skipped.

In the case where there is no tracking ID 51 with which a person is not associated (step S87: No), the tracking unit 140 finishes the tracking processing. In the case where there is a tracking ID 51 with which a person is not associated (step S87: Yes), the tracking unit 140 confirms whether or not each of the tracking IDs 51 with which persons are not associated is not associated with a person equal to or larger than the predetermined number of times (step S88). As a method for counting the number of times the person is not associated with the tracking ID 51, the number of times the detection result including the estimated region is added to the tracking information 151 in step S89 may be counted, the number of estimated regions may be counted, or other methods may be used.

In the case where the tracking ID 51 is not associated with a person equal to or larger than the predetermined number of times (step S88: Yes), the tracking unit 140 deletes a record relating to this tracking ID 51 from the tracking information 151 (step S89). In the case where the tracking ID 51 is not associated with a person smaller than the predetermined number of times (step S88: No), or after step S89 is finished, the tracking unit 140 estimates a region of the person on the input image on the basis of the record relating to the tracking ID 51 not associated with a person with reference to the tracking information 151 in a similar manner to step S82 (step S90). In the case where the estimated region has already been estimated in step S82, this processing may be skipped. Alternatively, in the case where there is no tracking ID 51 not associated with a person after step S89 is finished, the tracking unit 140 may skip the processing after step S87.

The tracking unit 140 then sets the region which is estimated (estimated region) of the tracking ID 51 not associated with a person on the input image as the object region 53 of the tracking result (step S91). The tracking unit 140 then updates the tracking information 151 by adding a record to the tracking information 151 in a state where it can be understood that the estimated region set as the object region 53 is not the detected object region but the estimated region (step S92). For example, the tracking unit 140 may indicate that the object region 53 included in the added record is the estimated region by blanking the feature amount 59, adding a flag indicating that the object region is the estimated region, or the like.

The tracking unit 140 finishes the tracking processing in step S69 as described above.

The tracking processing illustrated in FIG. 7 and FIG. 16 will be described further using FIG. 17 to FIG. 27.

Figure 18:
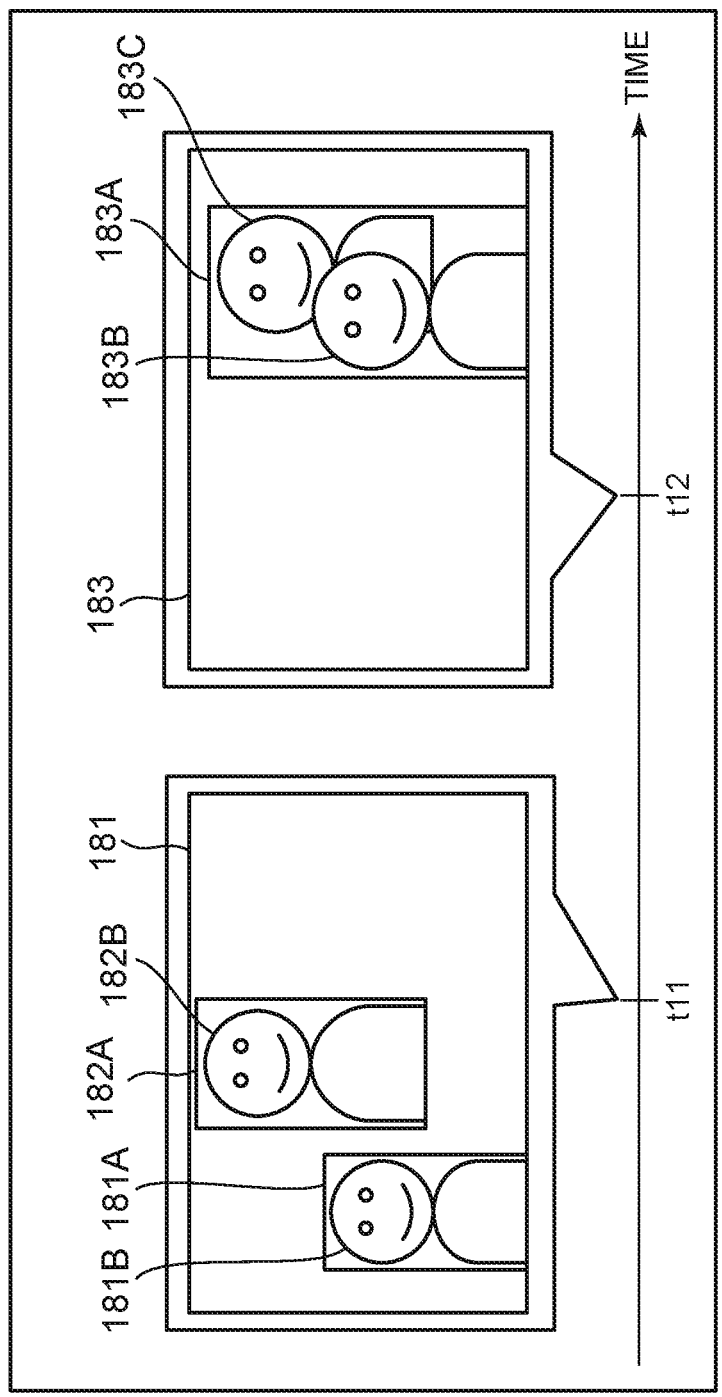
FIG. 18 is a diagram illustrating an input image where the estimated number of persons in the object region is two and an input image where the estimated number of persons in each of two object regions is one, which is temporally adjacent to the input image and which is input prior to the input image.

The tracking information 151E illustrated in FIG. 17 is an example of the tracking information 151 in the case where each of two object regions includes one person. Further, FIG. 18 is a diagram illustrating an example of an input image (current frame) in which the estimated number of persons in the object region is two and a previous frame in which the estimated number of persons in each of the two object regions is one. FIG. 18 indicates time on the horizontal axis.

In FIG. 18, it is assumed that the previous frame 181 is an image whose image ID is "IM11", and which is picked up at time t11, and the current frame 183 is an image whose image ID is "IM12", and which is picked up at time t12.

It is assumed that the detecting unit 120 detects an object region 181A and an object region 182A from the previous frame 181, and the object region 181A includes a person 181B. Further, it is assumed that the object region 182A includes a person 182B. It is assumed that the tracking ID 51 of "a3" illustrated in FIG. 17 is associated with the person 181B in the object region 181A, and the tracking ID 51 of "b3" is associated with the person 182B in the object region 182A.

It is assumed that, when the detecting unit 120 detects an object region 183A from the current frame 183, the estimating unit 130 estimates that the estimated number of persons in the object region 183A is two. That is, the object region to be subjected to processing becomes the object region 183A. Because the estimated number of persons in the object region 183A is two, step S71 is No, and the tracking unit 140 makes the processing proceed to step S72.

The tracking unit 140 determines whether or not each of the persons estimated to be included in the object region 183A is associated with the tracking ID 51 with reference to the tracking information 151E which is an example of the tracking information 151 (step S72). As illustrated in FIG. 18, it is assumed that the persons estimated to be included in the object region 183A are the person 183B and the person 183C. In the present example, it is assumed that the person 182B is associated with the tracking ID 51 of "a3", and the person 183C is not associated with any tracking ID 51.

Therefore, the tracking unit 140 makes the processing with respect to the person 183B included in the object region 183A proceed to step S73, and makes the processing with respect to the person 183C proceed to step S76.

The processing with respect to the person 183B will be described. Because the person 183B is associated with the tracking ID 51 of "a3", step S72 is Yes, and the tracking unit 140 sets the tracking ID 51 of the tracking result with respect to the person 183B included in the object region 183A to be tracked as "a3" and sets the object region 53 as the object region information with respect to the object region 183A included in the detection result 21 detected by the detecting unit 120 (step S73). It is then determined whether or not the estimated number of persons increases from the number of persons 57 (step S74). Because the estimated number of persons is two and the number of persons 57 included in the tracking information 151 is "1", the estimated number of persons is larger than the number of persons 57 included in the tracking information 151. Therefore, the tracking unit 140 makes the processing with respect to the person 183B included in the object region 183A proceed to step S80. The tracking unit 140 updates the tracking information 151 by adding a record relating to the tracking ID 51 in which the feature amount in the previous frame of the tracking ID 51 associated in step S72 is set as the feature amount 59 of the tracking result (step S80). That is, the tracking unit 140 does not update the feature amount 59 from records having the same tracking ID in records to be newly added to the tracking information 151.

FIG. 19 is a diagram illustrating an example of the tracking information 151F after the tracking information 151E is updated. The tracking information 151F is information obtained by adding a record 191A and a record 191B to the tracking information 151E illustrated in FIG. 17.

In step S80, the tracking unit 140 adds the record 191A to the tracking information 151E. As illustrated in FIG. 19, the record 191A includes "a3" as the tracking ID 51. Further, the record 191A includes "F11A" which is the feature amount 59 included in the tracking result (record in which the tracking ID 51 is "a3", and the time 52 is "t11") in the previous frame 181, as the feature amount 59.

In this manner, in the case where the number of objects estimated with respect to the object region 183A (first object region) on the current frame 183 including the tracked person 183B is larger than the number of objects estimated with respect to the object region 181A (second object region) in the input image (previous frame 181 whose image ID 58 is "IM11") temporally the closest to the input image among the tracking information 151E, the tracking unit 140 associates "F11A" which is the feature amount 59 extracted from the object region 181A as the tracking result with the object region 183A as the feature amount 59 of the object region 183A. By this means, even in the case where the person to be tracked enters a crowded environment, it is possible to prevent a situation where tracking cannot be performed as a result of the feature amount of the person being lost due to entry into the crowded environment. The tracking unit 140 then makes the processing proceed to S87.

The processing with respect to the person 183C will be described. As described above, because the person 183C is not associated with any tracking ID 51, step S72 is No, and the tracking unit 140 determines whether or not other persons associated with the tracking ID 51 are included in the object region including a person with which the tracking ID 51 is not associated (step S76). In the case of the present example, because the person 182B is associated with the tracking ID 51 of "a3", the tracking unit 140 makes the processing proceed to step S81.

The tracking unit 140 determines whether or not there is a tracking ID 51 not associated with any person included in the input image among the tracking IDs 51 included in the tracking information 151 (step S81). Referring to FIG. 17, because the tracking ID 51 of "b3" is not associated, the tracking unit 140 makes the processing proceed to step S82. In the case where the tracking ID 51 of "b3" is not included in the tracking information 151E, because step S81 is No, and it can be determined that this person is a person who is newly included in the input image, the tracking unit 140 makes the processing proceed to step S77.

In step S82, the tracking unit 140 estimates a region of the person on the input image on the basis of a record relating to the tracking ID 51 of "b3". It is then determined whether or not a difference between the estimated region and the object region detected by the detecting unit 120 falls within a predetermined range (step S83). At this time, the tracking unit 140 may compare a location of the object region with a location of the estimated region, or compare a ratio of overlapping of the object region and the estimated region with a predetermined threshold. In the case where the difference between the estimated region and the object region falls within the predetermined range (step S83: Yes), the tracking ID 51 of "b3" is associated with the person 183C. By performing step S73, step S74 and step S80, the tracking unit 140 stores the tracking information 151F in which the record 191B illustrated in FIG. 19 is added in the storage unit 150.

Further, FIG. 20 is a diagram illustrating an example of the tracking information 151G after the tracking information 151E is updated. The tracking information 151G is information obtained by adding a record 201A and a record 201B to the tracking information 151E illustrated in FIG. 17. Because the record 201A is similar to the record 191A described above, description will be omitted.

In the case where the difference between the estimated region and the object region is not within the predetermined range (step S83: No), because the person with which the tracking ID 51 is not associated is highly likely to be a person who is newly included in the input image, the tracking unit 140 performs the processing from step S77 to step S79 (step S85).

The record 201B in FIG. 20 includes "c3" newly provided as the tracking ID 51. Further, the record 201B includes the object region detected by the detecting unit 120 as the object region 53 and the number of persons estimated by the estimating unit 130 as the number of persons 57 in a similar manner to the record 201A. The record 201B may include "F12" which is the feature amount extracted from the object region 53 in step S79 as the feature amount 59. The tracking unit 140 may set "F11A" which is the feature amount 59 similar to that of the record 201A as the feature amount 59 of the record 201B assuming that records relating to the same object region include the same feature amount.

Figure 22:
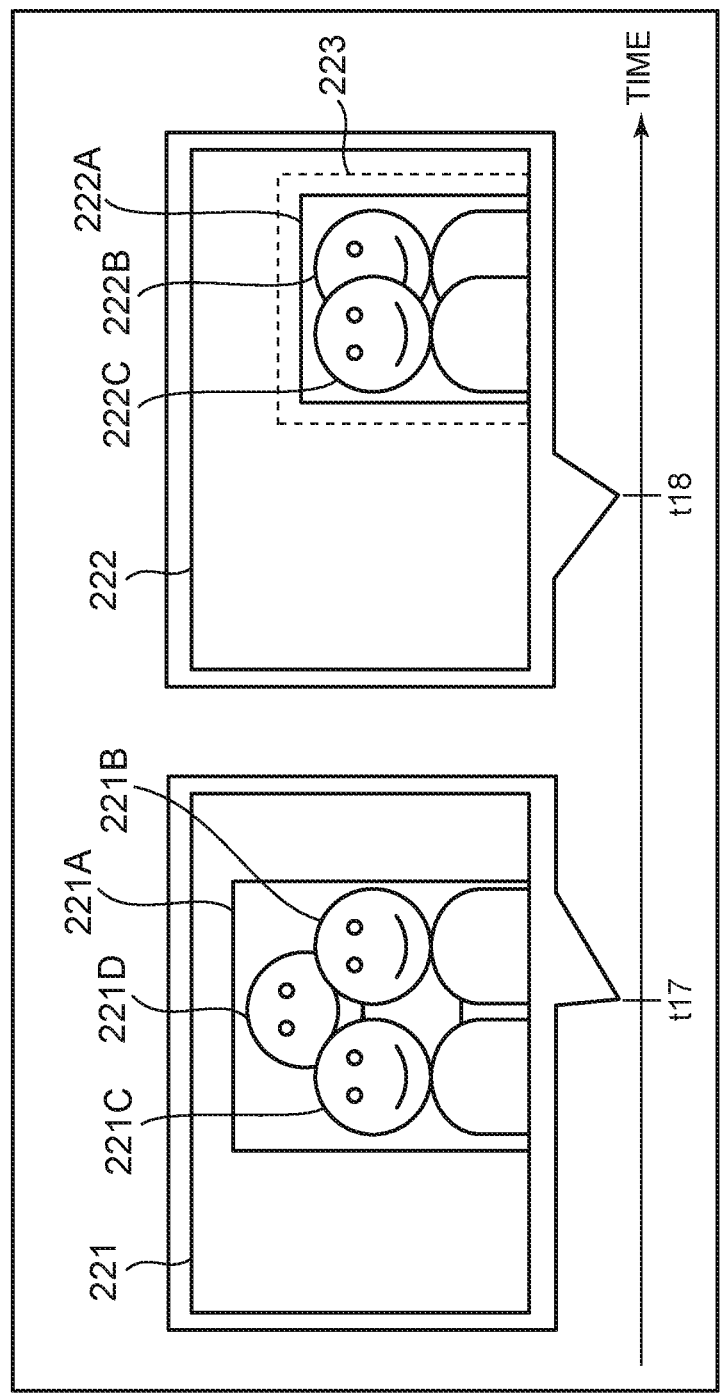
FIG. 22 is a diagram illustrating an example of an input image where the estimated number of persons in the object region is two and an input image where the estimated number of persons in the object region is three, which is temporally adjacent to the input image and which is input prior to the input image.

Further, another example will be described. The tracking information 151H illustrated in FIG. 21 is an example of the tracking information 151 in the case where one object region includes three persons. FIG. 22 is a diagram illustrating an example of the input image (current frame) in which the estimated number of persons in the object region is two, and the previous frame in which the estimated number of persons in the object region is three. FIG. 22 indicates time on the horizontal axis.

It is assumed that, in FIG. 22, the previous frame 221 is an image whose image ID is "IM17", and which is picked up at time t17, and the current frame 222 is an image whose image ID is "IM18", and which is picked up at time t18.

It is assumed that the detecting unit 120 detects an object region 221A from the previous frame 221, and the object region 221A includes a person 221B, a person 221C, and a person 221D. As illustrated in FIG. 22, the tracking IDs 51 of "a5", "b5" and "c5" are associated with of the image ID of "IM17". These tracking IDs 51 are associated with the object region 221A, and it is only necessary that one of the person 221B, the person 221C and the person 221D is associated with one of "a5", "b5" and "c5".

It is assumed that the detecting unit 120 detects an object region 222A from the current frame 222, and the estimating unit 130 estimates that the estimated number of persons in the object region 222A is two. That is, the object region to be subjected to processing becomes the object region 222A. Because the estimated number of persons in the object region 222A is two, step S71 is No, and the tracking unit 140 makes the processing proceed to step S72.

The tracking unit 140 determines whether or not each of the persons estimated to be included in the object region 222A is associated with the tracking ID 51 with reference to the tracking information 151H which is an example of the tracking information 151 illustrated in FIG. 21 (step S72). In the present example, it is assumed that each of the person 222B and the person 222C is associated with the tracking IDs 51 of "a5", "b5" and "c5". In the present example, the tracking unit 140 assumes that the person 222B and the person 222*c* are associated with one of "a5" and "b5".

FIG. 23 is a diagram illustrating an example of the tracking information 151J after the tracking information 151H is updated. The tracking unit 140 adds a record 231A and a record 231B in FIG. 23 to the tracking information 151H by performing step S73 to step S75.

The tracking unit 140 makes the processing proceed to step S87, and determines whether or not there is a tracking ID 51 with which a person is not associated with reference to the tracking information 151H (step S87). In the present example, because the tracking ID 51 of "c5" is not associated with a person, the tracking unit 140 makes the processing proceed to step S88. The tracking unit 140 confirms whether or not "c5" is not associated with a person equal to or larger than a predetermined number of times (step S88). In the present example, while the processing is made to proceed to step S90 because "c5" is not associated with a person smaller than the predetermined number of times, in the case where "c5" is not associated with a person equal to or larger than the predetermined number of times, the tracking unit 140 deletes all the records whose tracking ID 51 is "c5" from the tracking information 151H.

In step S90, the tracking unit 140 estimates a region of the person on the input image on the basis of a record relating to the tracking ID 51 of "c5". The tracking unit 140, for example, estimates a region 223 indicated with a dashed line in FIG. 22 as the estimated region. The tracking unit 140 then sets information indicating the region 223 as the object region 53 relating to "c5" (step S91) and updates the tracking information 151H by inserting the record 231C to the tracking information 151H (step S92). By this means, the tracking unit 140 can store the tracking information 151J which is updated tracking information in the storage unit 150.

As illustrated in FIG. 23, in the record 231C, the number of persons 57 and the feature amount 59 are blank. By this means, it can be understood that the record 231C is a record in which the estimated region is made the object region 53. As described above, it is only necessary that the record includes information indicating that the object region 53 is the estimated region.

Figure 25:
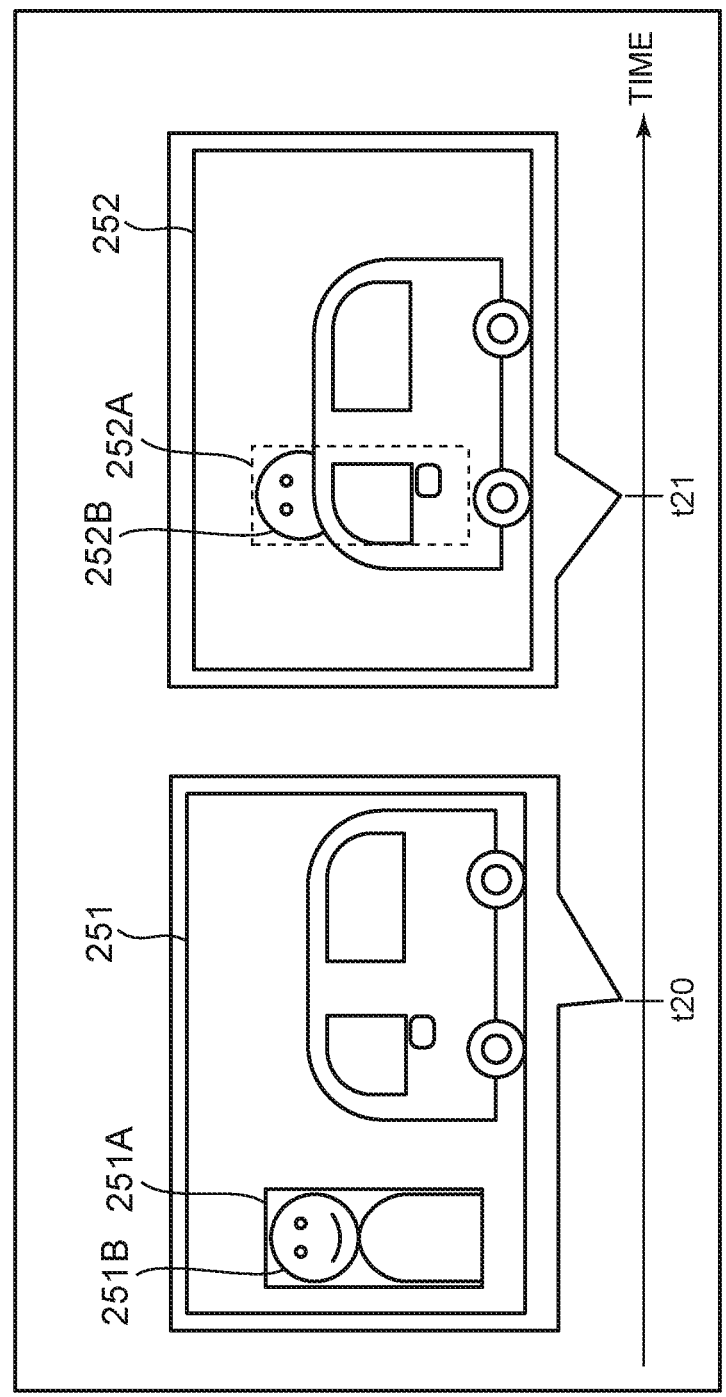
FIG. 25 is a diagram illustrating another example of the input image and the input image which is temporally adjacent to the input image and which is input prior to the input image.

Further, another example will be described. The tracking information 151K illustrated in FIG. 24 is an example of the tracking information 151 in the case where one object region includes one person. Further, FIG. 25 is a diagram illustrating an example of the current frame and the previous frame in which the estimated number of persons in the object region is one. FIG. 25 indicates time on the horizontal axis.

In FIG. 25, it is assumed that the previous frame 251 is an image whose image ID is "IM20", and which is picked up at time t20, and the current frame 252 is an image whose image ID is "IM21", and which is picked up at time t21.

It is assumed that the detecting unit 120 detects an object region 251A from the previous frame 251 and the object region 251A includes a person 251B. As illustrated in FIG. 24, the tracking ID 51 of "a6" is associated with the image ID of "IM19".

In the current frame 252, a person with which the tracking ID 51 of "a6" is associated hides behind a car. While, in the present example, it is assumed that the detecting unit 120 detects an object region from the current frame 252, it is assumed that the estimating unit 130 estimates that the estimated number of persons in the object region is zero.

Because the estimated number of persons in the object region is zero, step S71 is Yes, and the tracking unit 140 makes the processing proceed to step S86. The tracking unit 140 then discards the detection result of the detecting unit 120 (step S86) and makes the processing proceed to step S87.

The tracking unit 140 determines whether or not there is a tracking ID 51 with which a person is not associated with reference to the tracking information 151K illustrated in FIG. 24 (step S87). Because the tracking ID 51 of "a6" is not associated with a person, the tracking unit 140 makes the processing proceed to step S88. The tracking unit 140 then confirms whether or not "a6" is not associated with a person equal to or larger than a predetermined number of times (step S88). In the present example, the processing is made to proceed to step S90 assuming that "a6" is not associated with a person smaller than the predetermined number of times.

In step S90, the tracking unit 140 estimates a region of the person on the input image on the basis of a record relating to the tracking ID 51 of "a6". The tracking unit 140, for example, estimates a region 252A indicated with a dashed line in FIG. 25 as the estimated region. The tracking unit 140 then sets the information indicating the region 252A as the object region 53 relating to "a6" (step S91) and updates the tracking information 151K by inserting a new record to the tracking information 151K (step S92).

FIG. 26 is an example of tracking information 151L obtained by updating the tracking information 151K illustrated in FIG. 24. A record 261 illustrated in FIG. 26 is a record added by the tracking unit 140 in step S92. The record 261 includes the information indicating the region 252A estimated in step S90 as the object region 53.

Further, in the record 261, the number of persons 57 and the feature amount 59 are blank in a similar manner to the record 231C in FIG. 23. By this means, it can be understood that the record 261 is a record including the estimated region as the object region 53.

Further, as another example, it is assumed that, in the current frame 252 illustrated in FIG. 25, the detecting unit 120 detects the region 252A from the current frame 252 as the object region, and the estimating unit 130 estimates that the estimated number of persons in the object region is one. However, it is assumed that, because the person hides behind a car, the tracking unit 140 cannot associate the tracking ID 51 with the person (step S72: No).

Because the estimated number of persons in the object region including a person with which the tracking ID 51 is not associated is one, the tracking unit 140 makes the processing proceed to step S81. Because the tracking ID 51 of "a6" is not associated with a person, the tracking unit 140 makes the processing proceed to step S82.

The tracking unit 140 estimates a region of the person on the input image on the basis of a record relating to "a6" with reference to the tracking information 151K (step S82) and determines whether or not a difference between the object region and the estimated region falls within a predetermined range (step S83). In the case where the difference does not fall within the predetermined range, the tracking unit 140 performs processing from step S85. In the case where the difference falls within the predetermined range, the tracking unit 140 associates the tracking ID 51 (step S84). The tracking unit 140 then makes the processing proceed to the above-described step S73. Then, in step S75, the tracking unit 140 updates the tracking information (step S75). In a case of step S75 after step S84, the tracking unit 140 may update the tracking information using the previous feature amount. An example of the tracking information 151 updated in step S75 at this time will be illustrated in FIG. 27.

FIG. 27 is an example of tracking information 151M obtained by updating the tracking information 151K illustrated in FIG. 24. A record 271 illustrated in FIG. 27 is a record added by the tracking unit 140 in step S75. It can be understood that the feature amount 59 of the record 271 includes "F20" which is a feature amount similar to the feature amount 59 associated with the time 52 of "t20". In this manner, the tracking unit 140 may output the tracking information 151 as illustrated in FIG. 27.

The location 54, the width 55 and the height 56 of the tracking result, included in the object region 53 included in the tracking information 151 may be the detection result as is or may be those obtained by performing predetermined processing on the detection result. For example, in the case where a location where the image pickup apparatus is provided, a direction, a focal length, or the like, of the image pickup apparatus are known and a three-dimensional position and the size of the person can be calculated from a location of the person and the size on the input image, the size in a real world is estimated from the size of the detection result, and in the case where the size deviates as a body height of a person, a value obtained by correcting the size to a value within an appropriate range as a body height of a person may be set as the size of the tracking result (that is, the width 55 and the height 56).

Figure 28:
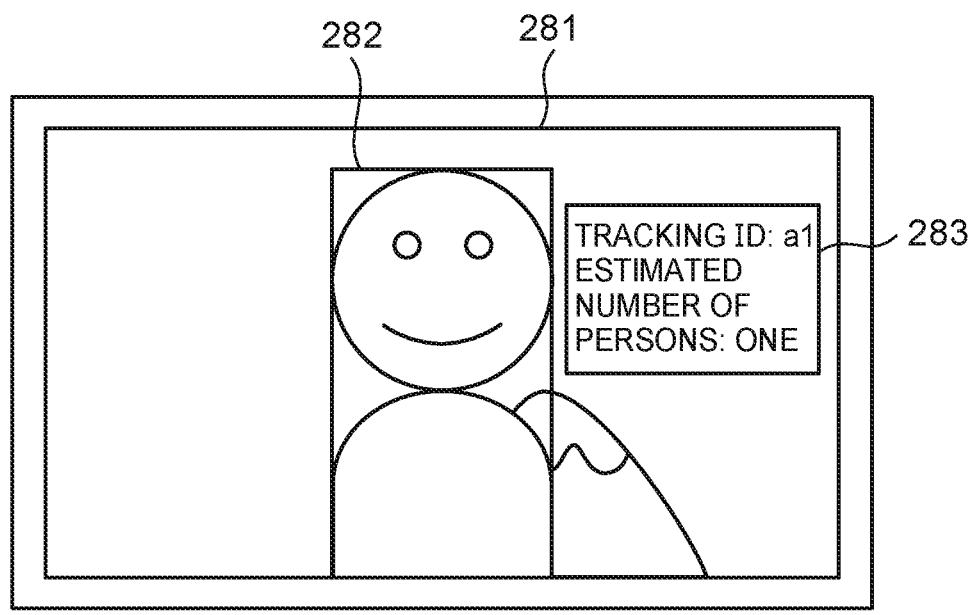
FIG. 28 is a diagram illustrating an example of an output screen output by an output unit.
Figure 29:
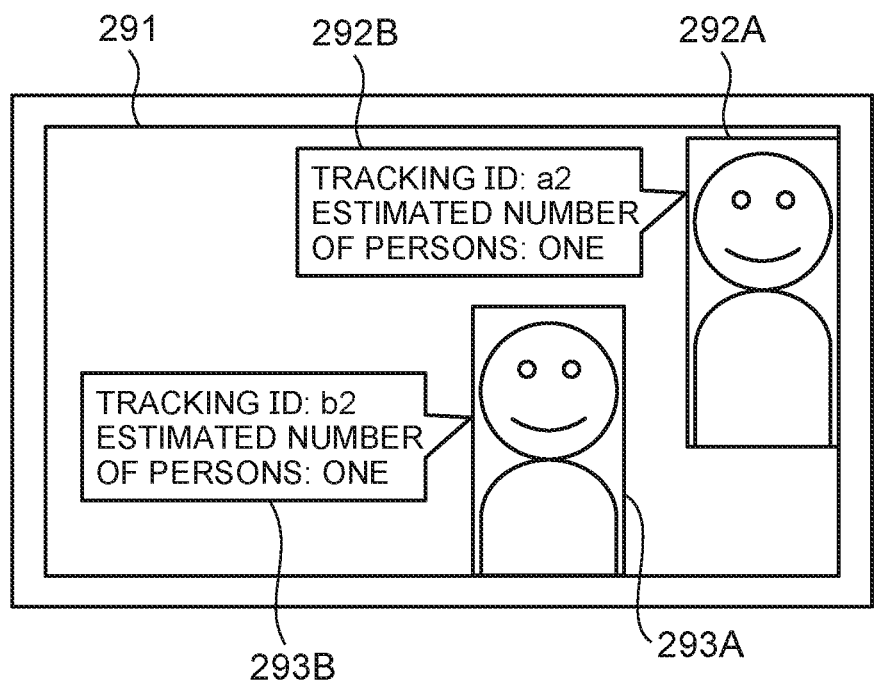
FIG. 29 is a diagram illustrating another example of the output screen output by the output unit.
Figure 30:
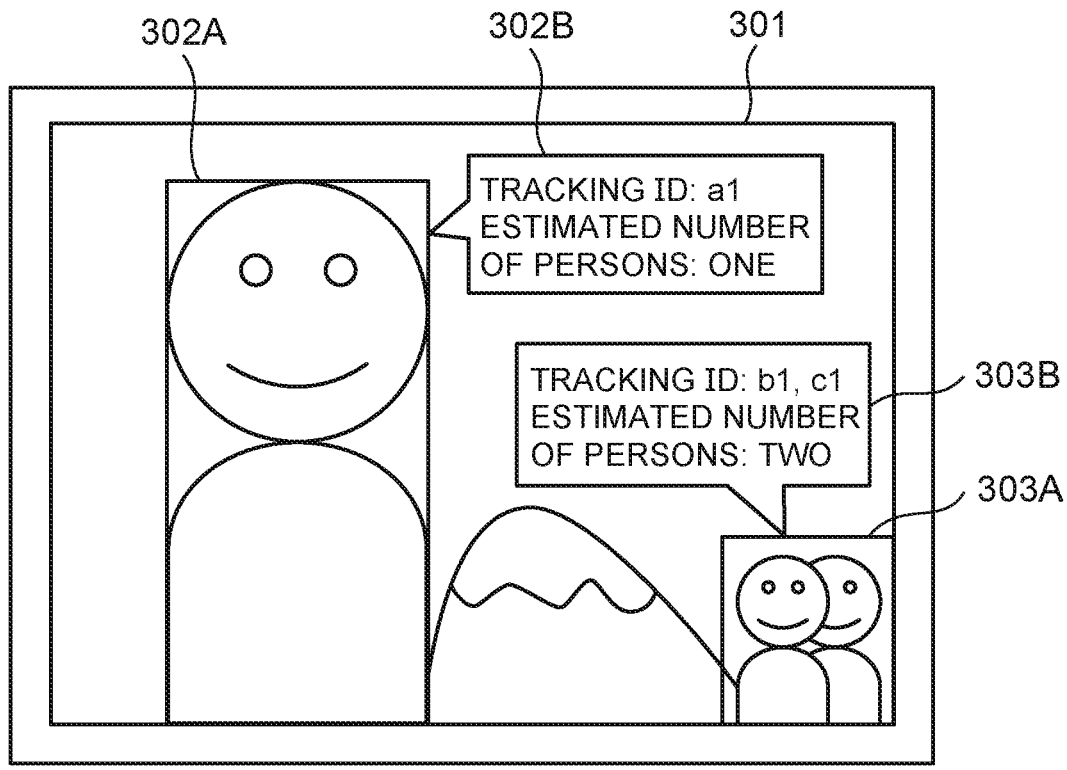
FIG. 30 is a diagram illustrating another example of the output screen output by the output unit.

An example of an output screen to be output by the output unit 160 in step S70 will be illustrated from FIG. 28 to FIG. 30.

FIG. 28 is a diagram illustrating an example of an output screen 281 to be output by the output unit 160 with respect to the current frame 82 illustrated in FIG. 8. The output unit 160 displays a screen obtained by superimposing a frame 282 indicating the object region 53 which is the tracking result on the current frame 82 which is the input image as the output screen 281 as illustrated in FIG. 28. Further, the output unit 160 may display information 283 indicating that the tracking ID 51 is "a1" and the estimated number of persons is "one" included in the tracking information 151A on the output screen 281. The information 283 is not limited to this, and may include other information included in the tracking information 151A.

FIG. 29 is a diagram illustrating an example of an output screen 291 to be output by the output unit 160 with respect to the current frame 122 illustrated in FIG. 12. The output unit 160 displays a screen obtained by superimposing a frame 292A indicating the object region 122A (object region 53 which is the tracking result) in FIG. 12 and a frame 293A indicating the object region 123A (object region 53 which is the tracking result) on the current frame 122 which is the input image as the output screen 291 as illustrated in FIG. 29. Further, as illustrated in FIG. 29, the output unit 160 may display information 292B indicating that the tracking ID 51 relating to the object region 122A is "a2" and the estimated number of persons is "one" included in the tracking information 151C on the output screen 291. At this time, the output unit 160 may display the information 292B on the output screen 291 in association with the object region 122A associated with the information 292B. In a similar manner, the output unit 160 may display the information 293B on the output screen 291 in association with the object region 123A.

FIG. 30 is a diagram illustrating an example of an output screen 301 to be output by the output unit 160 with respect to the current frame 142 illustrated in FIG. 14. The output unit 160 displays a screen obtained by superimposing a frame 302A indicating the object region 142A (object region 53 which is the tracking result) in FIG. 14 and a frame 303A indicating the object region 143A (object region 53 which is the tracking result) on the current frame 142 which is the input image as the output screen 301 as illustrated in FIG. 30. Further, as illustrated in FIG. 30, the output unit 160 may display information 302B indicating that the tracking ID 51 associated with the object region 142A is "a1" and the estimated number of persons is "one" included in the tracking information 151D on the output screen 301 in association with the object region 142A. In a similar manner, the output unit 160 may display the information 303B on the output screen 301 in association with the object region 143A.

In this manner, by the output unit 160 displaying the tracking result which is superimposed on the current frame, for example, a manager of the image processing apparatus 100 can easily recognize the tracking result by confirming the display screen.

As described above, the image processing apparatus 100 according to the present exemplary embodiment can track objects with high accuracy even in an environment where the objects largely overlap with each other, because the tracking unit 140 tracks objects included in the object region using the number of objects estimated in the object region.

For example, in the case where individual objects are tracked, there is a case where, in a crowded environment, tracking interrupts due to the object hiding behind other objects. Further, there is a possibility, under a crowded environment, accuracy of tracking is lowered as a result of the feature amount of an object which is desired to be tracked changing by being affected by other objects.

However, the image processing apparatus 100 according to the present exemplary embodiment, for example, tracks objects included in an object region by tracking the object region using the number of objects included in the object region and the estimated number of objects included in tracking information which is a tracking result of the objects until previous input images input to the image processing apparatus 100 temporally prior to an input image. By this means, it is possible to track a plurality of objects within the input image at the same time in parallel, so that it is possible to reduce the above-described interruption of tracking, or the like, in the case where individual objects are tracked. Therefore, according to the image processing apparatus 100 according to the present exemplary embodiment, it is possible to track objects with high accuracy even in an environment where the objects largely overlap with each other.

Second Exemplary Embodiment

A second exemplary embodiment of the present disclosure will be described with reference to the drawings. A minimal configuration of the present exemplary embodiment for solving the problems of the present disclosure will be described.

Figure 31:
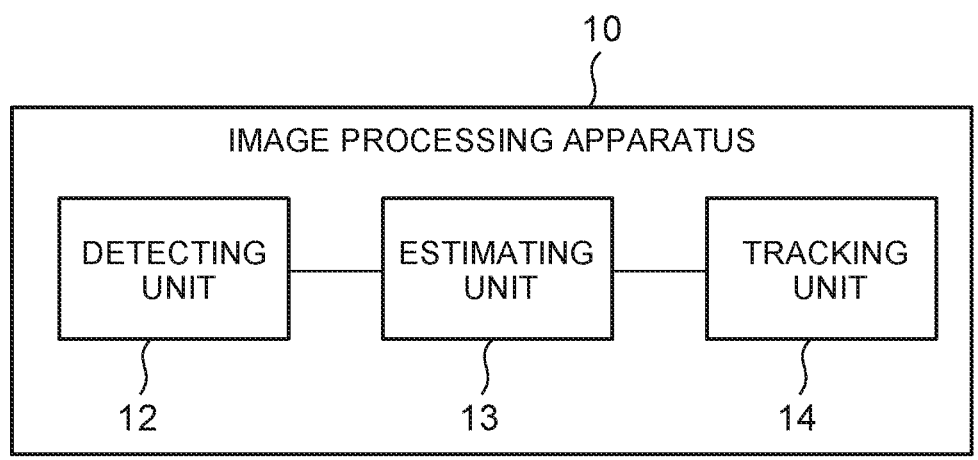
FIG. 31 is a functional block diagram illustrating an example of a functional configuration of an image processing apparatus according to a second exemplary embodiment.

FIG. 31 is a functional block diagram illustrating an example of a functional configuration of an image processing apparatus 10 according to the present exemplary embodiment. As illustrated in FIG. 31, the image processing apparatus 10 according to the present exemplary embodiment includes a detecting unit 12, an estimating unit 13 and a tracking unit 14.

The detecting unit 12 has a function of the detecting unit 120 in the above-described first exemplary embodiment. The detecting unit 12 detects an object region from an input image. A method for detecting an object region from an input image is not particularly limited, and, as described above, a publicly known technique such as a method in which a difference with a background image is acquired, a method in which a shape of a person is detected and a method in which features of a person learned in advance are used may be used. The detecting unit 12 supplies the detection result to the estimating unit 13.

The estimating unit 13 has a function of the estimating unit 130 in the above-described first exemplary embodiment. The estimating unit 130 estimates a number of objects included in the detected object region. The estimating unit 13 extracts an object region image from the input image relating to the detection result received from the detecting unit 12 and estimates the number of objects such as, for example, persons from the extracted object region image. A method for estimating the number of objects is not particularly limited, and a method in which the number of objects is estimated by comparing the object region image with an image for each number of persons stored in the storage unit, may be used. The estimating unit 13 supplies the estimated number of objects to the tracking unit 14.

The tracking unit 14 has a function of the tracking unit 140 in the above-described first exemplary embodiment. The tracking unit 14 tracks objects included in the object region using the number of objects estimated by the estimating unit 13. For example, the tracking unit 14 tracks the object on the basis of tracking information indicating a result of tracking in an input image temporally prior to the input image. The tracking information includes tracking IDs corresponding to the number of objects included in the object region, information indicating the object region and a feature amount extracted from the object region with respect to the object region. The tracking unit 14 tracks the objects included in the object region to which the tracking IDs corresponding to the number of objects are provided on the basis of the tracking information. For example, the tracking unit 14 tracks the objects included in the object region by comparing the number of objects included in the object region with the number of objects relating to the result of tracking in the input image temporally prior to the input image.

Figure 32:
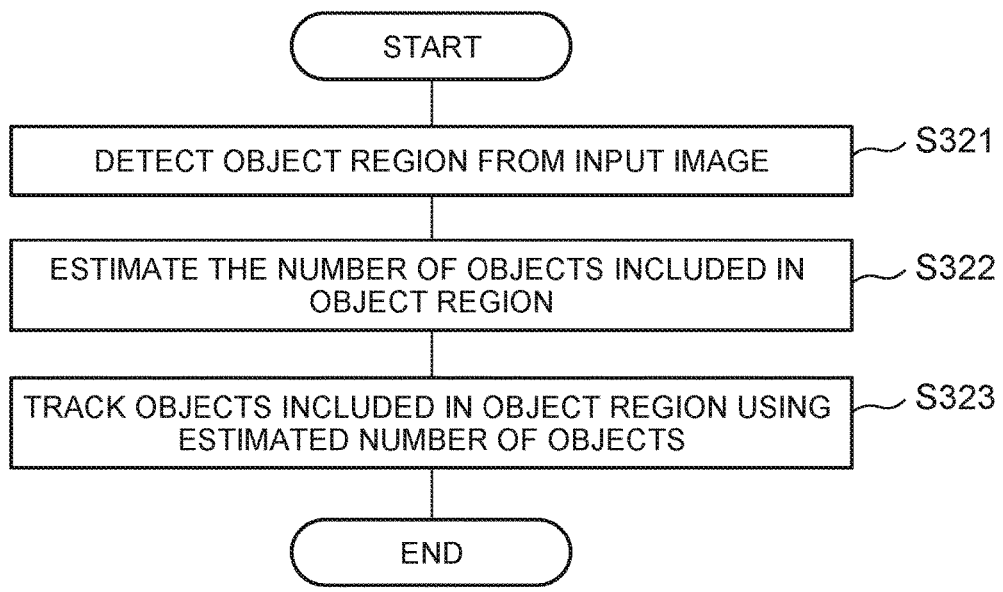
FIG. 32 is a flowchart illustrating an example of flow of processing of the image processing apparatus according to the second exemplary embodiment.

Flow of processing of the image processing apparatus 10 according to the present exemplary embodiment will be described with reference to FIG. 32. FIG. 32 is a flowchart illustrating an example of the flow of the processing of the image processing apparatus 10 according to the present exemplary embodiment.

As illustrated in FIG. 32, the detecting unit 12 detects an object region from an input image (step S321). The estimating unit 13 then estimates a number of objects included in the detected object region (step S322). The tracking unit 14 then tracks objects included in the object region using the estimated number of objects (step S323).

For example, in the case where individual objects are tracked, there is a case where, in a crowded environment, tracking is interrupted by the object hiding behind other objects. Further, there is a possibility that, under a crowded environment, accuracy of tracking is lowered as a result of the feature amount of the object which is desired to be tracked changing by being affected by other objects.

However, in the image processing apparatus 10 according to the present exemplary embodiment, the tracking unit 14 tracks the objects included in the object region using the number of objects estimated in the object region. For example, the image processing apparatus 10 tracks the objects included in the object region by tracking the object region using the number of objects included in the object region and the estimated number of objects included in tracking information which is a tracking result of the objects until previous input images input to the image processing apparatus 10 temporally prior to an input image. By this means, the image processing apparatus 10 can track a plurality of objects within the input image at the same time in parallel, so that it is possible to reduce the above-described interruption of tracking, or the like, in the case where individual objects are tracked. Therefore, according to the image processing apparatus 10 according to the present exemplary embodiment, even in an environment where objects largely overlap with each other, it is possible to track objects with high accuracy.

(Concerning Hardware Configuration)

Figure 33:
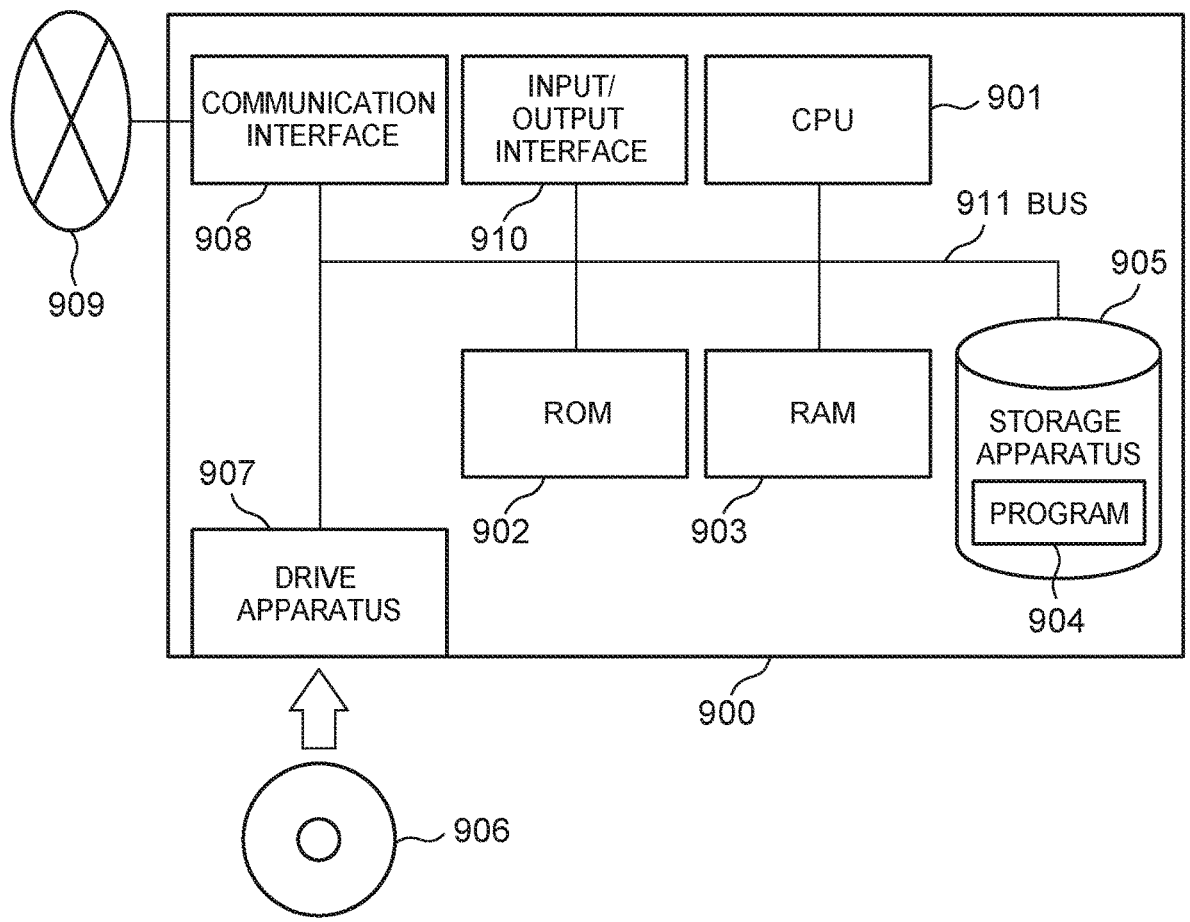
FIG. 33 is a diagram illustratively explaining a hardware configuration of a computer (information processing apparatus) which can realize each exemplary embodiment.

In each exemplary embodiment of the present disclosure, each component of each apparatus indicates a block of a functional unit. Part or all of components of each apparatus is implemented by arbitrary combination of the information processing apparatus 900 and programs, for example, as illustrated in FIG. 33. FIG. 33 is a block diagram illustrating an example of a hardware configuration of the information processing apparatus 900 which implements each component of each apparatus. The information processing apparatus 900 includes the following configuration as an example.

CPU (Central Processing Unit) 901
 ROM (Read Only Memory) 902
 RAM (Random Access Memory) 903
 program 904 loaded to RAM 903
 storage apparatus 905 storing program 904
 drive apparatus 907 performing read/write from/to recording medium 906
 communication interface 908 connecting to communication network 909
 input/output interface 910 performing input/output of data
 bus 911 connecting each component Each component of each apparatus in each exemplary embodiment is implemented by the CPU 901 acquiring and executing the program 904 which realizes these functions. The program 904 which realizes the function of each component of each apparatus is, for example, stored in the storage apparatus 905 or the ROM 902 in advance, and is loaded to the RAM 903 and executed by the CPU 901 as needed. The program 904 may be supplied to the CPU 901 via the communication network 909, may be stored in the recording medium 906 in advance, or the drive apparatus 907 may read out the program and supply the program to the CPU 901.

A method for realizing each apparatus includes various modified examples. For example, each apparatus may be realized by arbitrary combination of each separate information processing apparatus 900 and programs for each component. Further, a plurality of components provided at each apparatus may be realized by arbitrary combination of one information processing apparatus 900 and programs.

Further, part or all of the components of each apparatus is realized with other general-purpose or dedicated circuits, processors, or the like, or combination thereof. These may be configured with a single chip or may be configured with a plurality of chips connected via a bus.

Part or all of the components of each apparatus may be realized by combination of the above-described circuits, or the like, and programs.

In the case where part or all of the components of each apparatus is realized with a plurality of information processing apparatuses, circuits, or the like, the plurality of information processing apparatuses, circuits, or the like, may be disposed in a concentrated manner or may be disposed in a distributed manner. For example, the information processing apparatus, circuits, or the like, may be realized as a form such as a client and server system, a cloud computing system, or the like, in which they are respectively connected via a communication network.

The above-described exemplary embodiments are preferred exemplary embodiments of the present disclosure, the scope of the present disclosure is not limited only to the above-described exemplary embodiments, and a person skilled in the art can modify or replace the above-described exemplary embodiments without departing from the gist of the present disclosure to construct a form in which various changes have been made.

FIG. 1
100 IMAGE PROCESSING APPARATUS
110 IMAGE ACQUIRING UNIT
120 DETECTING UNIT
130 ESTIMATING UNIT
140 TRACKING UNIT
150 STORAGE UNIT
152 IMAGE DB
151 TRACKING INFORMATION
160 OUTPUT UNIT
FIG. 2
21 DETECTION RESULT
21A IMAGE ID
21B LOCATION
21C WIDTH
21D HEIGHT
FIG. 3
1 THE NUMBER OF PERSONS
2 IMAGE
FIG. 5
51 TRACKING ID
52 TIME
53 OBJECT REGION
54 LOCATION
55 WIDTH
56 HEIGHT
57 THE NUMBER OF PERSONS
58 IMAGE ID
59 FEATURE AMOUNT
151 TRACKING INFORMATION
FIG. 6
1 START
S61 ACQUIRE INPUT IMAGE
S62 DETECT OBJECT REGION FROM INPUT IMAGE
S63 EXTRACT OBJECT REGION IMAGE FROM INPUT IMAGE ON THE BASIS OF DETECTION RESULT
S64 EXTRACT FEATURE AMOUNT FROM EXTRACTED OBJECT REGION IMAGE
S65 CALCULATE DEGREE OF SIMILARITY

S66 CALCULATE LIKELIHOOD WITH RESPECT TO EACH NUMBER OF PERSONS
S67 ESTIMATE THE NUMBER OF PERSONS INCLUDED IN OBJECT REGION IMAGE ON THE BASIS OF LIKELIHOOD
S68 TRACKING PROCESSING
S69 UPDATE TRACKING INFORMATION
S70 OUTPUT RESULT OF TRACKING PROCESSING
2 END
FIG. 7
1 START S68
S71 IS ESTIMATED NUMBER OF PERSONS IS ZERO?
S72 IS TRACKING ID ASSOCIATED WITH PERSON IN OBJECT REGION?
S73 SET OBJECT REGION DETECTED BY DETECTING UNIT AS OBJECT REGION OF TRACKING RESULT
S74 DOES ESTIMATED NUMBER OF PERSONS INCREASE?
S75 UPDATE TRACKING INFORMATION
S76 IS ESTIMATED NUMBER OF PERSONS IS ONE OR ARE OTHER PERSONS ASSOCIATED WITH TRACKING ID INCLUDED IN OBJECT REGION?
S77 PROVIDE NEW TRACKING ID
S78 SET OBJECT REGION DETECTED BY DETECTING UNIT AS OBJECT REGION OF TRACKING RESULT
S79 UPDATE TRACKING INFORMATION
S80 UPDATE TRACKING INFORMATION USING PREVIOUS FEATURE AMOUNT
S81 IS THERE TRACKING ID WHICH IS NOT ASSOCIATED?
S82 ESTIMATE REGION OF PERSON WITH WHICH TRACKING ID IS NOT ASSOCIATED ON INPUT IMAGE
S83 DOES DIFFERENCE BETWEEN ESTIMATED REGION AND OBJECT REGION FALL WITHIN PREDETERMINED RANGE?
S84 ASSOCIATE TRACKING ID
2 TO S86
3 TO S87
4 TO S85
FIG. 8
1 TIME
FIG. 9
51 TRACKING ID
52 TIME
53 OBJECT REGION
54 LOCATION
55 WIDTH
56 HEIGHT
57 THE NUMBER OF PERSONS
58 IMAGE ID
59 FEATURE AMOUNT
151A TRACKING INFORMATION
FIG. 10
51 TRACKING ID
52 TIME
53 OBJECT REGION
54 LOCATION
55 WIDTH
56 HEIGHT
57 THE NUMBER OF PERSONS
58 IMAGE ID
59 FEATURE AMOUNT
151B TRACKING INFORMATION
FIG. 11
1 TIME
FIG. 12
1 TIME
FIG. 13
51 TRACKING ID
52 TIME
53 OBJECT REGION
54 LOCATION
55 WIDTH
56 HEIGHT
57 THE NUMBER OF PERSONS
58 IMAGE ID
59 FEATURE AMOUNT
151C TRACKING INFORMATION
FIG. 14
1 TIME
FIG. 15
51 TRACKING ID
52 TIME
53 OBJECT REGION
54 LOCATION
55 WIDTH
56 HEIGHT
57 THE NUMBER OF PERSONS
58 IMAGE ID
59 FEATURE AMOUNT
151D TRACKING INFORMATION
FIG. 16
1 FROM S75, S79, S80
2 FROM S83
3 FROM S71
S85 PERFORM S77 TO S79
S86 DISCARD DETECTION RESULT
S87 IS THERE TRACKING ID WHICH IS NOT ASSOCIATED?
S88 IS THERE TRACKING ID WHICH IS NOT ASSOCIATED PREDETERMINED NUMBER OF TIMES?
S89 DELETE RECORD RELATING TO TRACKING ID FROM TRACKING INFORMATION
S90 ESTIMATE REGION OF PERSON WITH WHICH TRACKING ID IS NOT ASSOCIATED ON INPUT IMAGE
S91 SET ESTIMATED REGION AS OBJECT REGION OF TRACKING RESULT
S92 UPDATE TRACKING INFORMATION
4 S69 END
FIG. 17
51 TRACKING ID
52 TIME
53 OBJECT REGION
54 LOCATION
55 WIDTH
56 HEIGHT
57 THE NUMBER OF PERSONS
58 IMAGE ID
59 FEATURE AMOUNT
151E TRACKING INFORMATION
FIG. 18
1 TIME
FIG. 19
51 TRACKING ID
52 TIME
53 OBJECT REGION
54 LOCATION
55 WIDTH
56 HEIGHT
57 THE NUMBER OF PERSONS

58 IMAGE ID
59 FEATURE AMOUNT
151F TRACKING INFORMATION
FIG. 20
51 TRACKING ID
52 TIME
53 OBJECT REGION
54 LOCATION
55 WIDTH
56 HEIGHT
57 THE NUMBER OF PERSONS
58 IMAGE ID
59 FEATURE AMOUNT
151G TRACKING INFORMATION
FIG. 21
51 TRACKING ID
52 TIME
53 OBJECT REGION
54 LOCATION
55 WIDTH
56 HEIGHT
57 THE NUMBER OF PERSONS
58 IMAGE ID
59 FEATURE AMOUNT
151H TRACKING INFORMATION
FIG. 22
1 TIME
FIG. 23
51 TRACKING ID
52 TIME
53 OBJECT REGION
54 LOCATION
55 WIDTH
56 HEIGHT
57 THE NUMBER OF PERSONS
58 IMAGE ID
59 FEATURE AMOUNT
151J TRACKING INFORMATION
FIG. 24
51 TRACKING ID
52 TIME
53 OBJECT REGION
54 LOCATION
55 WIDTH
56 HEIGHT
57 THE NUMBER OF PERSONS
58 IMAGE ID
59 FEATURE AMOUNT
151K TRACKING INFORMATION
FIG. 25
1 TIME
FIG. 26
51 TRACKING ID
52 TIME
53 OBJECT REGION
54 LOCATION
55 WIDTH
56 HEIGHT
57 THE NUMBER OF PERSONS
58 IMAGE ID
59 FEATURE AMOUNT
151L TRACKING INFORMATION
FIG. 27
51 TRACKING ID
52 TIME
53 OBJECT REGION
54 LOCATION

55 WIDTH
56 HEIGHT
57 THE NUMBER OF PERSONS
58 IMAGE ID
59 FEATURE AMOUNT
151M TRACKING INFORMATION
FIG. 28
283 TRACKING ID: a1, ESTIMATED NUMBER OF PERSONS: ONE
FIG. 29
292B TRACKING ID: a2, ESTIMATED NUMBER OF PERSONS: ONE
293B TRACKING ID: b2, ESTIMATED NUMBER OF PERSONS: ONE
FIG. 30
302B TRACKING ID: a1, ESTIMATED NUMBER OF PERSONS: ONE
303B TRACKING ID: b1, c1, ESTIMATED NUMBER OF PERSONS: TWO
FIG. 31
10 IMAGE PROCESSING APPARATUS
12 DETECTING UNIT
13 ESTIMATING UNIT
14 TRACKING UNIT
FIG. 32
1 START
S321 DETECT OBJECT REGION FROM INPUT IMAGE
S322 ESTIMATE THE NUMBER OF OBJECTS INCLUDED IN OBJECT REGION
S323 TRACK OBJECTS INCLUDED IN OBJECT REGION USING ESTIMATED NUMBER OF OBJECTS
2 END
FIG. 33
904 PROGRAM
905 STORAGE APPARATUS
907 DRIVE APPARATUS
908 COMMUNICATION INTERFACE
910 INPUT/OUTPUT INTERFACE
911 BUS

What is claimed is:

1. An image processing apparatus comprising:
a processor configured to execute:
a detecting unit configured to detect an object region from an input image;
an estimating unit configured to estimate a number of objects included in the detected object region; and
a tracking unit configured to track objects included in the object region using the estimated number of objects,
wherein the tracking unit tracks the objects included in the object region in the input image on the basis of tracking information which indicates a result of tracking of the objects in an input image temporally prior to the input image, and in which identifiers corresponding to the number of objects are associated with the object region, and a feature amount of the object region is associated with each identifier.

2. The image processing apparatus according to claim 1, wherein, in the case where the number of objects estimated with respect to a first object region which includes the tracked objects and which is the object region on the input image is larger than the number of objects estimated with respect to a second object region which is an object region in an input image temporally the closest to the input image among the tracking information, the tracking unit associates a feature amount extracted from the second object region as a result of tracking with the first object region.

3. The image processing apparatus according to claim 1, wherein, in the case where the number of objects estimated with respect to a first object region which includes the tracked objects and which is the object region on the input image is equal to or smaller than the number of objects estimated with respect to a second object region which is an object region in an input image temporally the closest to the input image among the tracking information, the tracking unit associates a feature amount extracted from the first object region as a result of tracking with the first object region.

4. The image processing apparatus according to claim 1, wherein the processor further configured to execute:
an output unit configured to output the result of tracking by the tracking unit, the result being superimposed on the input image.

5. A tracking method comprising:
detecting an object region from an input image;
estimating a number of objects included in the detected object region; and
tracking objects included in the object region using the estimated number of objects,
wherein the objects included in the object region in the input image are tracked on the basis of tracking information which indicates a result of tracking of the objects in an input image temporally prior to the input image and in which identifiers corresponding to the number of objects are associated with the object region, and a feature amount of the object region is associated with each identifier.

6. The tracking method according to claim 5, wherein, in the case where the number of objects estimated with respect to a first object region which includes the tracked objects and which is the object region on the input image is larger than the number of objects estimated with respect to a second object region which is an object region in an input image temporally the closest to the input image among the tracking information, a feature amount extracted from the second object region as a result of tracking is associated with the first object region.

7. The tracking method according to claim 5, comprising:
outputting the result of tracking, the result being superimposed on the input image.

8. A non-transitory computer readable medium having stored thereon program for causing a computer to execute:
a process of detecting an object region from an input image;
a process of estimating a number of objects included in the detected object region; and
a process of tracking objects included in the object region using the estimated number of objects,
wherein the objects included in the object region in the input image are tracked in the process of tracking on the basis of tracking information which indicates a result of tracking of the objects in an input image temporally prior to the input image and in which identifiers corresponding to the number of objects are associated with the object region and a feature amount of the object region is associated with each identifier.

9. The non-transitory computer readable medium according to claim 8, wherein, in the case where the number of objects estimated with respect to a first object region which includes the tracked objects and which is the object region on the input image is larger than the number of objects estimated with respect to a second object region which is an object region in an input image temporally the closest to the input image among the tracking information, a feature amount extracted from the second object region as a result of tracking is associated with the first object region.

10. The non-transitory computer readable medium according to claim 8, wherein, in the case where the number of objects estimated with respect to a first object region which includes the tracked objects and which is the object region on the input image is equal to or smaller than the number of objects estimated with respect to a second object region which is an object region in an input image temporally the closest to the input image among the tracking information, a feature amount extracted from the first object region as a result of tracking is associated with the first object region.

11. The non-transitory computer readable medium according to claim 8 causing the computer to execute:
a process of outputting the result of tracking, the result being superimposed on the input image.

* * * * *